United States Patent
Fukagawa et al.

(10) Patent No.: US 7,857,041 B2
(45) Date of Patent: Dec. 28, 2010

(54) VEHICLE AIR CONDITIONER WITH ROTARY DOOR

(75) Inventors: Hiroshi Fukagawa, Okazaki (JP); Kazuya Niimi, Hekinan (JP)

(73) Assignee: Denso Corporation, Kariya (JP)

( * ) Notice: Subject to any disclaimer, the term of this patent is extended or adjusted under 35 U.S.C. 154(b) by 974 days.

(21) Appl. No.: 11/712,375

(22) Filed: Feb. 28, 2007

(65) Prior Publication Data
US 2007/0204985 A1  Sep. 6, 2007

(30) Foreign Application Priority Data
Mar. 1, 2006 (JP) ............................. 2006-054621

(51) Int. Cl.
*B60H 1/00* (2006.01)
(52) U.S. Cl. .................. 165/202; 165/204; 165/42; 165/43; 454/121; 454/126; 454/156; 454/160; 454/161; 237/12.3 A; 237/12.3 B
(58) Field of Classification Search ............... 165/202, 165/203, 204, 42, 43, 103; 454/121, 126, 454/156, 160, 161; 237/12.3 A, 12.3 B
See application file for complete search history.

(56) References Cited

U.S. PATENT DOCUMENTS

| | | | | |
|---|---|---|---|---|
| 6,231,437 B1 * | 5/2001 | Loup et al. | .................. | 454/160 |
| 6,852,024 B2 * | 2/2005 | Seki | ........................... | 454/121 |
| 6,913,529 B2 * | 7/2005 | Seki | ........................... | 454/121 |
| 2004/0093884 A1 | 5/2004 | Seki et al. | | |

FOREIGN PATENT DOCUMENTS

| | | | |
|---|---|---|---|
| DE | 19916992 A1 | * | 11/1999 |
| DE | 10025334 A1 | * | 11/2000 |
| EP | 1013491 A1 | * | 6/2000 |
| FR | 2771966 A1 | * | 6/1999 |
| FR | 2778151 A1 | * | 11/1999 |
| FR | 2788019 A1 | * | 7/2000 |
| JP | 2000071748 A | * | 3/2000 |
| JP | 2002-370520 | | 12/2002 |

* cited by examiner

*Primary Examiner*—John K Ford
(74) *Attorney, Agent, or Firm*—Harness, Dickey & Pierce, PLC

(57) ABSTRACT

A rotary door for a vehicle air conditioner includes a rotation shaft, a door surface that is spaced from an axial line of the rotation shaft radially outside and is rotated integrally with the rotation shaft, and a seal portion provided at a peripheral end portion of the door surface. The door surface has a first door face at a center portion, and a second door face positioned at left and right sides of the first door face. The second door face has a radial dimension from the axial line, that is smaller than that of the first door face so as to form a door outer peripheral space between the seal portion of the second door face and a seal rib of an air conditioning case. Furthermore, the second door face is provided with an air guide plate extending radial outside for guiding air.

7 Claims, 17 Drawing Sheets

FOOT MODE

F/D MODE

FOOT MODE

F/D MODE

DEF MODE

FOOT MODE

FOOT MODE

F/D MODE

FOOT MODE
(MAXIMUM HEATING)

FOOT MODE
(INTERMEDIATE
TEMPERATURE CONTROL)

F/D MODE

VEHICLE AIR CONDITIONER WITH ROTARY DOOR

CROSS REFERENCE TO RELATED APPLICATION

This application is based on Japanese Patent Application No. 2006-054621 filed on Mar. 1, 2006, the contents of which are incorporated herein by reference in its entirety.

FIELD OF THE INVENTION

The present invention relates to a vehicle air conditioner having an air-outlet mode selecting mechanism using a rotary door. More particularly, the present invention relates to a structure of a rotary door.

BACKGROUND OF THE INVENTION

JP-A-2004-155263 (corresponding to US 2004/0093884 A1) discloses two rotary doors 25 and 26 that are located to open and close a defroster opening 20, a center face opening 21a and a foot opening 22, as shown in FIGS. 17 to 19

The first rotary door 25 opens and closes the foot opening 22 and a communication passage 27a. The defroster opening 20 and the center face opening 21a are provided on a downstream side of the communication passage 27a. The second rotary door 26 opens and closes the defroster opening 20 and the center face opening 21a.

The rotary doors 25 and 26 include door surfaces 25c and 26c provided at positions separated radially outward from the centers of rotary shafts 25a and 26a by predetermined dimensions. The door surfaces 25c and 26c of the rotary doors 25 and 26 are turned with the rotary shafts 25a and 26a, respectively.

FIG. 17 and FIG. 18 show a foot mode in the related art. FIG. 17 shows a maximum heating state in which a cold air passage 16 is completely closed by an air mixing door 14. FIG. 18 shows an intermediate temperature control state in which the air mixing door 14 is operated to a position with an opening degree.

In the foot mode, when the first rotary door 25 is operated to rotate clockwise by a small angle θ with respect to the completely closed position of the communication passage 27a, a clearance X is formed between the first rotary door 25 and a case-side seal rib 29, so that the first rotary door 25 opens the communication passage 27a by a small amount with the clearance X, while substantially fully opening the foot opening 22.

At this time, the second rotary door 26 fully opens the defroster opening 20 and completely closes the center face opening 21a. Thus, most of conditioned air whose temperature is adjusted by the air mixing door 14 flows into the foot opening 22 to be blown off from foot air outlet ports 24a and 24b toward the passenger's foot area in a passenger compartment.

A part of the conditioned air passes through the clearance X of the communication passage 27a to flow into the defroster opening 20, thereby obtaining defrosting performance of a vehicle window pane. FIG. 19 shows an intermediate temperature control state of a foot/defroster (F/D) mode in which both the communication passage 27a and the foot opening 22 are in a substantially half-opened state by the first rotary door 25.

In the vehicle air conditioner, side face openings are normally set to be located on both left and right sides of the center face opening 21a. The side face openings are always opened in any air outlet modes. This is for the following reason.

Side face air outlet ports supplied with the conditioned air through the above-described side face openings are provided on both left and right sides of a vehicle dashboard (instrument panel). Thus, cool air is blown off from the side face air outlet ports in the cooling operation in summer season, and in addition, warm air is also blown off from the side face air outlet ports toward a passenger's upper body on the window side in a heating operation in winter season.

This can solve a problem that the heating is lacked because the passenger's upper body on the window side (around the shoulder on the window side) receives cool radiation from the window pane on the side of the vehicle to feel cold at chilly time in winter season. Further, the blowoff of warm air from the side face air outlet ports in the heating operation in winter season can obtain a defrosting effect of the window pane on the vehicle side.

In the foot mode or foot/defroster mode which is used as an air outlet mode in the heating operation in winter season, in addition to the foot opening 22, the defroster opening 20 and the side face openings are simultaneously opened, so that the warm air is blown off to the passenger's foot area, the vehicle windshield, and the passengers upper body on the window side at the same time.

At this time, in order to ensure the comfort of a heating feeling and required defrosting performance, it is important that a ratio of an amount of air blown from the defroster opening 20 to an amount of air blown from the side face opening is set to an appropriate value. For example, when the defroster blown-air amount is too much and the side face blown-air amount is excessively small, the blown air from the defroster opening 20 burns the passenger's face, which causes a shortage in heating (feel of coldness) to the passenger's upper body on the window side, resulting in degraded heating feeling.

Conversely, when the defroster blown-air amount is excessively small and the side face blown-air amount is too much, the defrosting performance of the vehicle windshield becomes short, and the feel of heating at the passenger's upper body becomes excessive, resulting in deterioration in heating feeling.

However, the first rotary door 25 serves only as a mechanism for opening and closing the foot opening 22 and the communication passage 27a. For this reason, the use of the first rotary door 25 cannot serve to adjust the ratio of the defroster blown-air amount to the side face blown-air amount.

When a top position (rotational angle θ) of the first rotary door 25 is changed due to air pressure applied to the first rotary door 25 in the foot mode, the clearance X is changed. This may lead to variations in ratio of the blown air amount on the defroster and side-face side to the blown air amount on the foot side. Thus, it is difficult to keep the ratio of the defroster and side face blown-air amount to the foot blown-air amount to a preset appropriate value.

In the intermediate temperature control state in the foot mode shown in FIG. 18 and in the foot/defroster mode shown in FIG. 19, the opened part of the communication passage 27a is located in vicinity of the cold air passage 16. On the other hand, the foot opening 22 is located in vicinity of the outlet side of a warm air passage 18 downstream of a heater core 15. The cooled air in the cold air passage 16 is likely to flow to the defroster opening 20 side. In contrast, to the foot opening 22 side, the warm air in the warm air passage 18 is likely to flow.

Thus, a difference between a temperature of the blown air on the defroster and side-face side and a temperature of the blown air on the foot side (a difference between the upper and lower blown-air temperatures) becomes excessively large. Thus, the excessive decrease in blown air temperature on the defroster/side face side results in degradation in defrosting performance, which causes shortage of heating of the passenger's upper body on the window side. The excessive increase in blown air temperature on the foot side disadvantageously leads to degradation in comfort to the passenger.

SUMMARY OF THE INVENTION

In view of the foregoing problems, it is an object of the present invention to provide an air conditioner for a vehicle using a rotary door, which can appropriately set the ratio of the defroster blown-air amount to the side face blown-air amount in the foot mode.

It is another object of the present invention to provide an air conditioner for a vehicle, which can maintain the ratio of the defroster/side face blown-air amount to the foot blown-air amount to a predetermined air amount ratio in the foot mode, regardless of variation in rotational position of the rotary door.

It is a further object of the present invention to be capable of setting an appropriate difference between the upper and lower blown-air temperatures both in the foot mode and the foot/defroster mode in an air conditioner for a vehicle.

It is a further object of the present invention to provide a rotary door which can be suitably used for opening and closing an air passage.

According to a first aspect of the present invention, an air conditioner for a vehicle includes: an air conditioning case for defining an air passage through which air flows into the passenger compartment; a heating heat exchanger for heating air located in the air conditioning case; and an air outlet opening portion provided in the air conditioning case at a downstream air side of the heating heat exchanger. For example, the air outlet opening portion includes a defroster opening through air is blown toward a windshield of the vehicle, a center face opening through which air is blown toward a first upper area of the passenger compartment, a side face opening through which air is blown toward a second upper area of the passenger compartment, and a foot opening through which air is blown toward a lower area of the passenger. The side face opening is provided at two sides of the center face opening in a vehicle left-right direction. The air conditioner further includes: a seal rib provided in the air conditioning case at a peripheral end portion of the foot opening; a first communication path provided in the air conditioning case to communicate with the defroster opening and the center face opening; a second communication path provided in the air conditioning case at left and right sides of the first communication path in the vehicle left-right direction to communicate with the side face opening and the defroster opening; a first door that is a rotary door and is located to open and close the foot opening; and a second door that is located to open and close the defroster opening and the center face opening.

In the air conditioner of the first aspect, the first door includes a rotation shaft, a door surface that is spaced from an axial line of the rotation shaft radially outside and is rotated integrally with the rotation shaft, and a seal portion provided at a peripheral end portion of the door surface. Furthermore, the door surface has a first door face at a position corresponding to the first communication path, and a second door face positioned at left and right sides of the first door face to correspond to the second communication path. The first door face has an outer peripheral shape such that the seal portion of the first door face contacts the seal rib, the second door face has a radial dimension from the axial line, that is smaller than that of the first door face so as to form a door outer peripheral space between the seal portion of the second door face and the seal rib. When the first door is rotated to a foot-mode position to open the foot opening, the seal portion of the first door face contacts the seal rib to shut a path communication between the foot opening and the first communication path, and the second communication path communicates with the foot opening through the door outer peripheral space. Furthermore, the second door face is provided with an air guide part that guides an air stream to flow toward the side face opening while restricting an air stream flowing toward the defroster opening through the door outer peripheral space when the first door is rotated to the foot-mode position. Accordingly, the air conditioner can appropriately set the ratio of a defroster blown-air amount blown from the defroster opening to a side face blown-air amount blown from the side face opening in a foot mode. Furthermore, it is possible to maintain the ratio of a defroster/side face blown-air amount blown from the defroster opening and the side face opening to the foot blown-air amount to a predetermined air amount ratio in the foot mode, regardless of variation in rotational position of the rotary door. Furthermore, it is possible to set an appropriate difference between upper and lower blown-air temperatures both in the foot mode and a foot/defroster mode.

For example, the rotary shaft of the first door may be located in parallel with an arrangement direction where the side face opening and the center face opening are arranged, and the air guide part is a plate member provided on the second door surface and extending in a radial outside of the rotary shaft. Alternatively, the first door may be made of resin, and the air guide part may be formed integrally with the second door surface of the first door. Furthermore, the second door face may be inclined such that the radial dimension is reduced from a portion adjacent to the first door face toward an axial end in the first door.

According to a second aspect of the present invention, an air conditioner includes: an air conditioning case for defining an air passage through which air flows into the passenger compartment; a heating heat exchanger for heating air, located in the air conditioning case; and an air outlet opening portion provided in the air conditioning case at a downstream air side of the heating heat exchanger. The air outlet opening portion includes a defroster opening through air is blown toward a windshield of the vehicle, a center face opening through which air is blown toward a first upper area of the passenger compartment, a side face opening through which air is blown toward a second upper area of the passenger compartment, and a foot opening through which air is blown toward a lower area of the passenger. Generally, the side face opening is provided at two sides of the center face opening in a vehicle left-right direction.

The air conditioner of the second aspect further includes: a first communication path provided in the air conditioning case to communicate with the defroster opening and the center face opening; a second communication path provided in the air conditioning case at left and right sides of the first communication path in the vehicle left-right direction to communicate with the side face opening and the defroster opening; a first door that is a rotary door and is located to open and close the foot opening; a second door that is located to open and close the defroster opening and the center face opening; a first seal rib for defining a peripheral end portion of a door-upstream opening portion at an upstream side of the first door in the air conditioning case; and a second seal rib for defining a peripheral end portion of the foot opening. The first door includes a rotation shaft, a door surface that is spaced from an axial line of the rotation shaft radially outside and is rotated integrally with the rotation shaft, and a seal portion provided at a peripheral end portion of the door surface. Furthermore, the door surface has a first door face at a position corresponding to the first communication path, and a second door face positioned at left and right sides of the first door face to correspond to the second communication path, the first door face has an outer shape such that the seal portion of the first door face contacts the second seal rib, and at least a part of the second door face has a radial dimension from the axial line, that is smaller than that of the first door face so as to form a door outer peripheral space between the seal portion of the second door face and the second seal rib. When the first door is rotated to a foot-mode position to open the foot opening, the seal portion of the first door face contacts the second seal rib to shut a path communication between the foot opening and the first communication path, and the second communication path communicates with the foot opening through the door outer peripheral space. The door surface has an anti-foot opening side peripheral end that is shaped such that the seal portion of the anti-foot opening side peripheral end contacts an entire area of the second seal rib when the foot door is rotated to the foot-mode position. In addition, the first seal rib is provided with a door-side opening portion such that the door-upstream opening portion directly communicate with the second communication passages through the door-side opening portion when the foot door is rotated to the foot-mode position. Accordingly, the air conditioner can appropriately set the ratio of a defroster blown-air amount blown from the defroster opening to a side face blown-air amount blown from the side face opening in a foot mode. Furthermore, it is possible to maintain the ratio of a defroster/side face blown-air amount blown from the defroster opening and the side face opening to the foot blown-air amount to a predetermined air amount ratio in the foot mode, regardless of variation in rotational position of the rotary door. Furthermore, it is possible to set an appropriate difference between upper and lower blown-air temperatures both in the foot mode and a foot/defroster mode.

According to a third aspect of the present invention, a rotary door for opening and closing a passage includes: a rotation shaft; a door surface that is spaced from an axial line of the rotation shaft radially outside, is rotated integrally with the rotation shaft, and has a first door face having a radial dimension from the axial line of the rotary shaft and a second door face inclined radially inside from the first door face at an end portion of the first door face in an axial direction; a side wall through which an axial end portion of the door surface is connected to the rotary shaft at an end side of the rotary shaft in the axial direction; a seal portion provided at peripheral end portions of the door surface and the side wall in a circumferential direction; and an air guide plate for guiding an air flow, wherein the air guide plate extends from the second door face radially outside. Accordingly, air stream can be suitably guided using the air guide plate.

According to a fourth aspect of the present invention, a rotary door for opening and closing a passage of an air duct includes: a rotation shaft; a door surface that is spaced from an axial line of the rotation shaft radially outside, is rotated integrally with the rotation shaft, has a first door face having a radial dimension from the axial line of the rotary shaft and a second door face inclined radially inside from the first door face at an end portion of the first door face in an axial direction; a side wall through which an axial end portion of the door surface is connected to the rotary shaft at an end side of the rotary shaft in the axial direction; and a seal portion provided at peripheral end portions of the door surface and the side wall in a circumferential direction. Furthermore, the first door face of the door surface is provided with a recessed portion recessed radially inside in a center area in the axial direction. Accordingly, the rotary door can suitably control an air flow ratio in plural air paths in the air duct.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

First Embodiment

Figure 1:
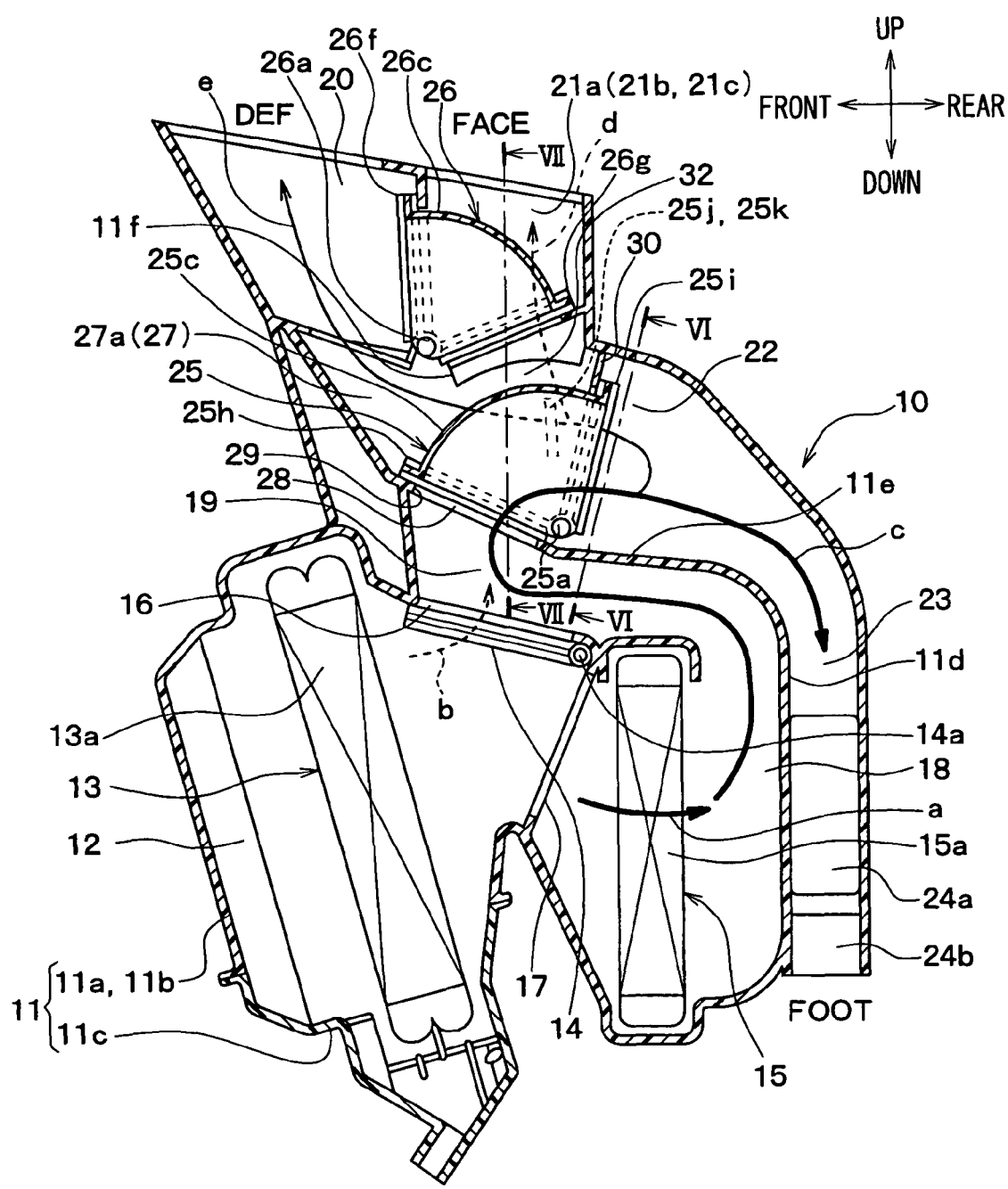
FIG. 1 is a schematic vertical sectional view showing an air conditioning unit for a vehicle air conditioner in a foot mode, at a center portion in a vehicle right-left direction, according to a first embodiment of the present invention.
Figure 2:
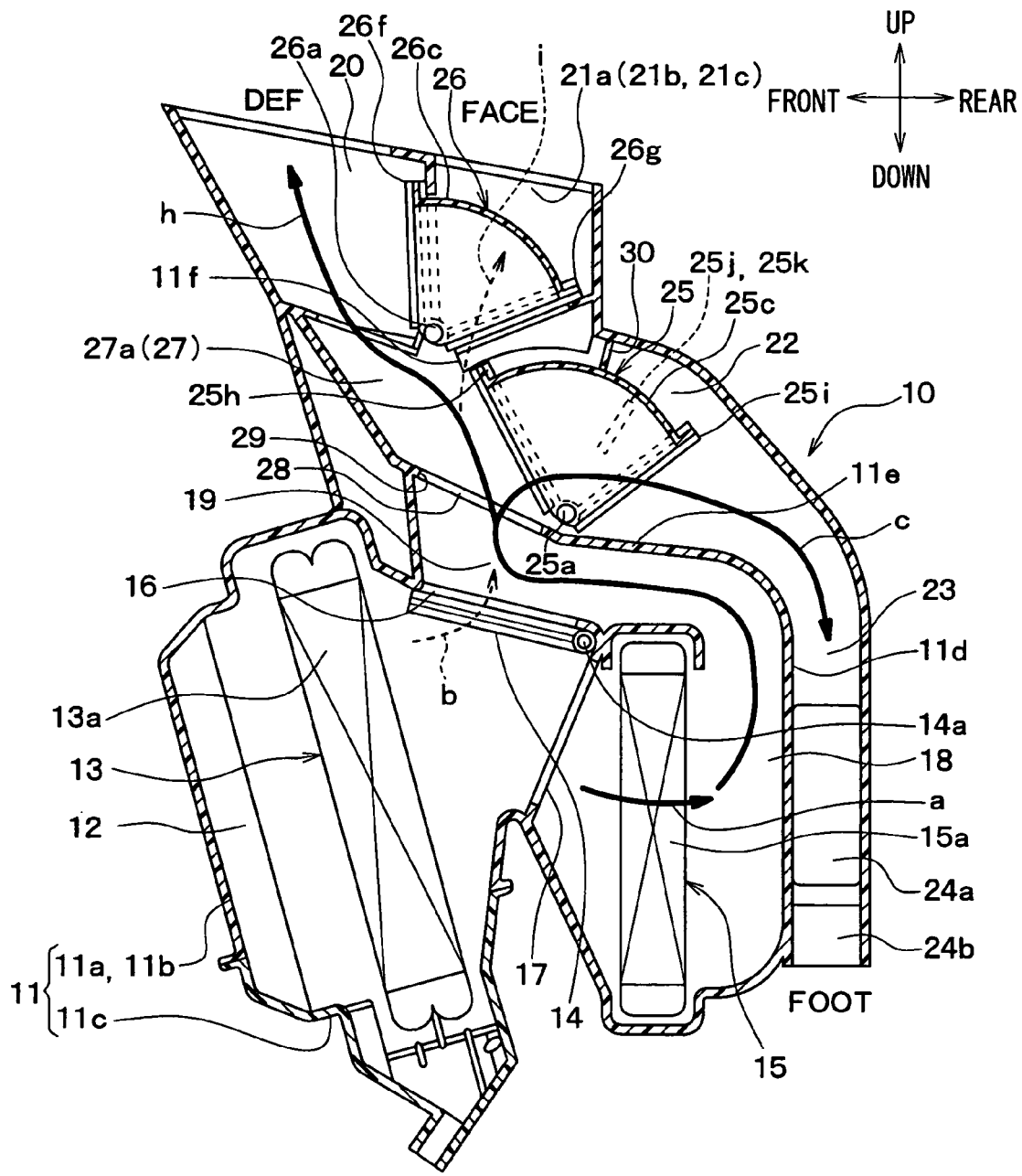
FIG. 2 is a schematic vertical sectional view showing the air conditioning unit in a foot/defroster mode, at the center portion in the vehicle right-left direction, according to the first embodiment.
Figure 3:
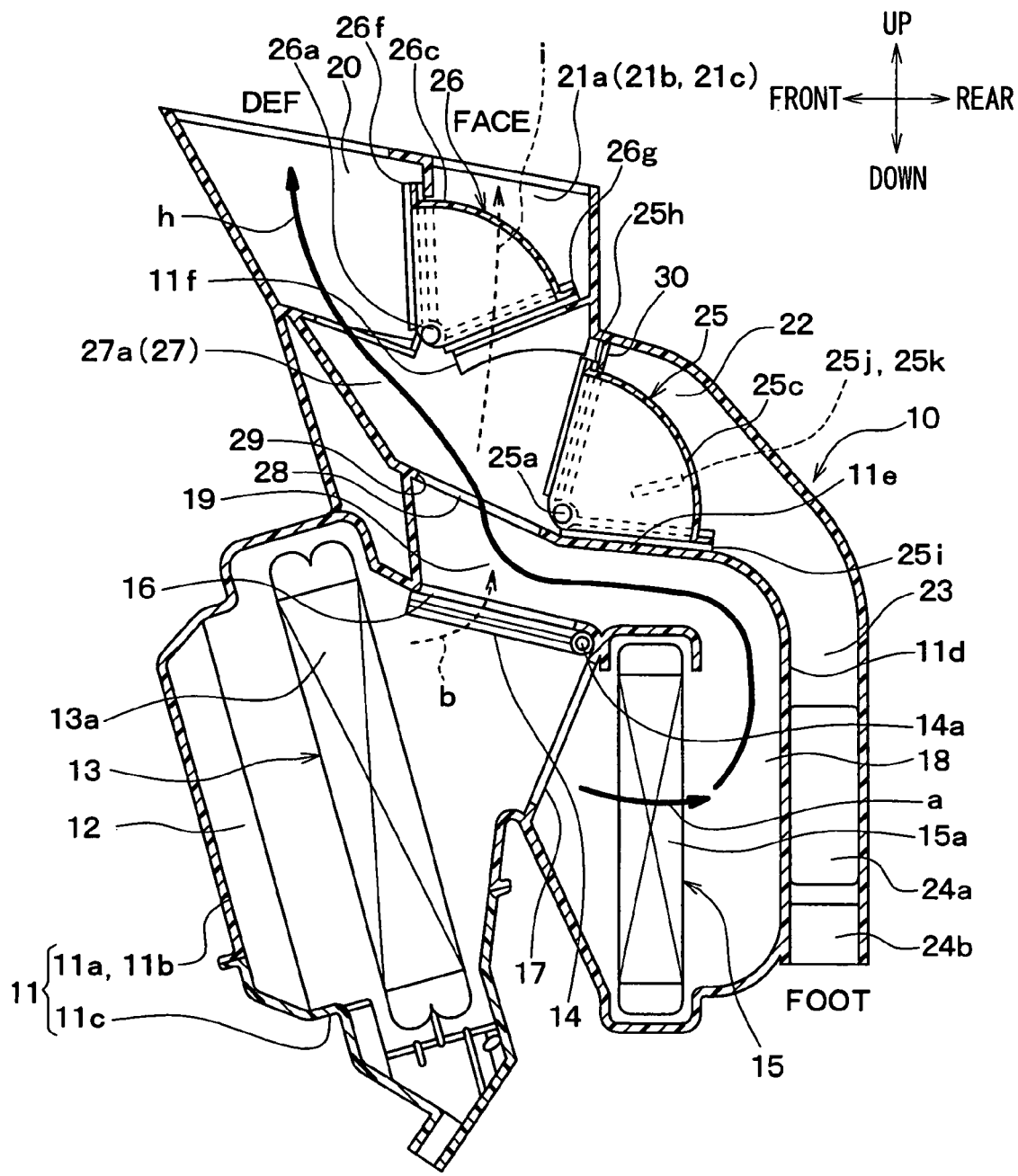
FIG. 3 is a schematic vertical sectional view showing the air conditioning unit in a defroster mode at the center portion in the vehicle right-left direction, according to the first embodiment.

A first embodiment of the present invention will be described with reference to FIGS. 1 to 8. First, an air conditioning unit 10 for a vehicle air conditioner will be now described with reference to FIGS. 1 to 3. FIG. 1 is a schematic vertical sectional view showing the air conditioning unit 10 in a foot mode, at a center portion in a vehicle right-left direction. FIG. 2 is a schematic vertical sectional view showing the air conditioning unit in a foot/defroster mode, and FIG. 3 is a schematic vertical sectional view showing the air conditioning unit in a defroster mode when a foot opening is fully closed.

The air conditioning unit 10 is disposed nearly at a center area in the right-left (width) direction of a dashboard (not shown) located at the front of a passenger compartment of a vehicle. The up and down and front and rear arrows of FIGS. 1 to 3, and the up and down and left and right arrows of FIG. 7 denote the directions of the air conditioning unit in a mounted state on the vehicle. The interior unit of a vehicle air conditioner is broadly divided into the above-described air conditioning unit 10 disposed nearly at the center area and a blower unit (not shown) disposed in a position offset to a front passenger's seat side inside the dashboard.

The blower unit includes an inside/outside air switching box for switching between outside air (i.e., air outside the passenger compartment) and inside air (i.e., air inside the passenger compartment), as is known well, and a centrifugal blower for blowing the air introduced into this inside/outside air switching box. The air blown by the blower unit flows into an air inflow space 12 located on the most front side in an air conditioning case 11 of the air conditioning unit 10.

The case 11 forms an air passage through which air flows into the passenger compartment. The case 11 is formed of resin having some degree of elasticity and a high mechanical strength, such as polypropylene. For convenience in releasing a formed product from a mold, or for the reason of assembling air-conditioning parts into the case, specifically, the case 11 is divided into a plurality of division cases, and then these division cases are integrally combined into one piece.

Figure 6:
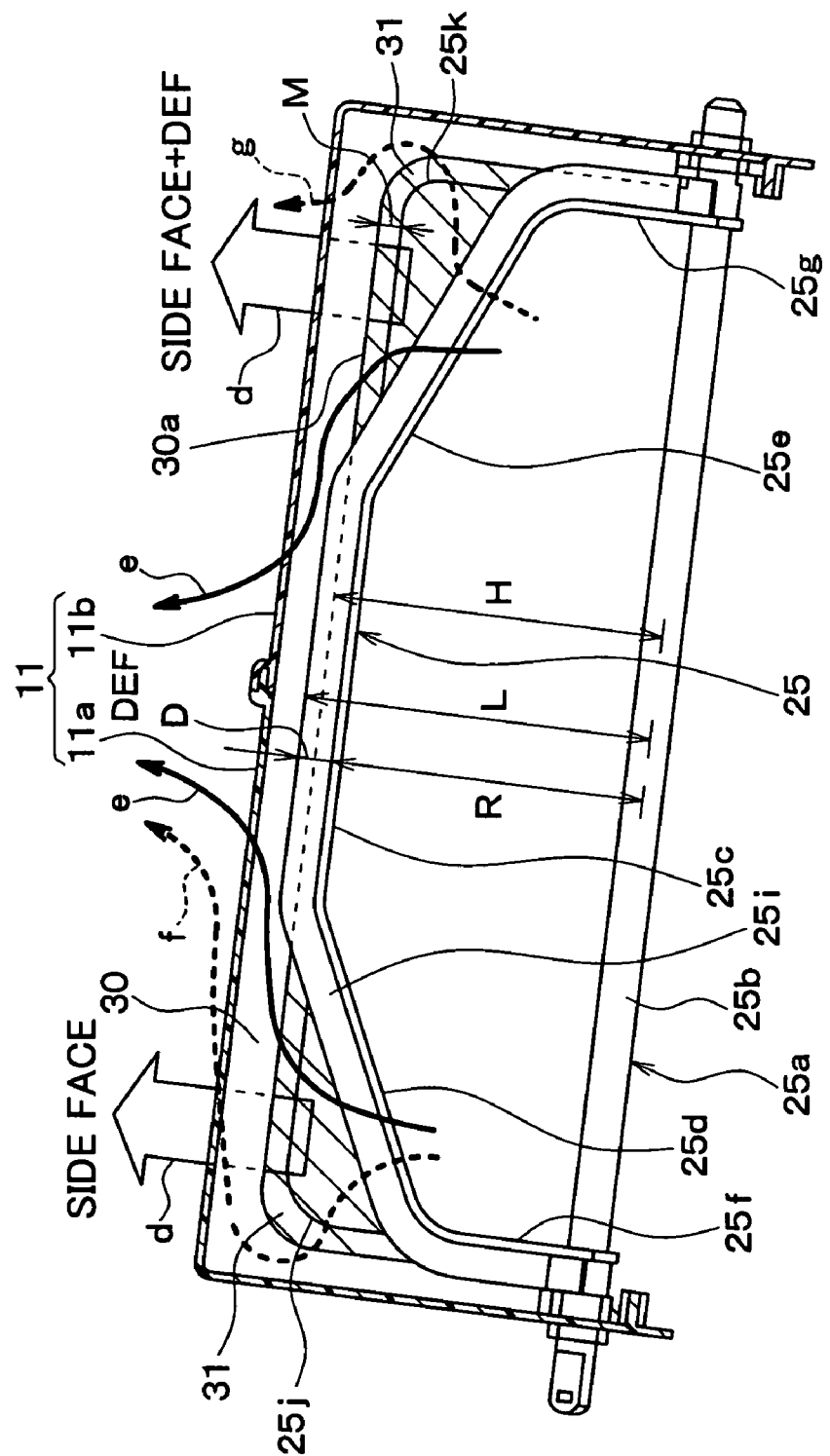
FIG. 6 is a cross-sectional view taken along the line VI-VI in FIG. 1.
Figure 7:
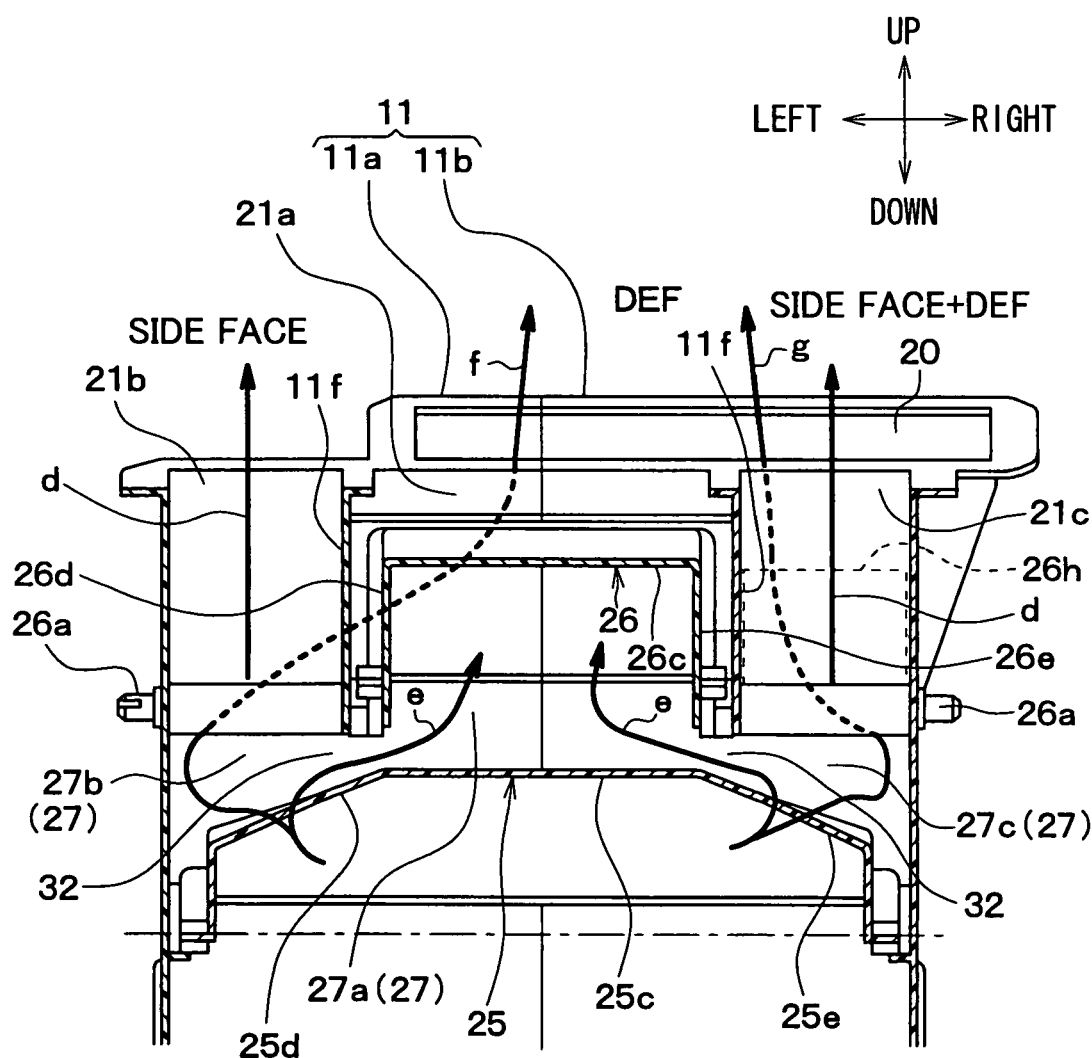
FIG. 7 is a cross-sectional view taken along the line VII-VII in FIG. 1.

In this embodiment, the case 11 is constructed of upper left and right division cases 11a and 11b, and a lower division case 11c. The division positions of the upper left and right division cases 11a and 11b are illustrated in FIGS. 6 and 7 to be described later.

An evaporator 13 serving as a heat exchanger for cooling is disposed longitudinally nearly in the vertical direction or the up-down direction at a rear part of the air inflow space 12 in the case 11 of the air conditioning unit 10 to be inclined by a small inclined angle. That is, the evaporator 13 is disposed longitudinally such that air inflow and outflow surfaces of a core portion 13a extend in the vertical direction (up-down direction).

Thus, the air blown from the blower unit flows into the air inflow space 12, flows from the space 12 to the core portion 13a of the evaporator 13, and then passes through the core portion 13a from the front to the rear thereof. In the evaporator 13, as well known, low-pressure refrigerant reduced in pressure by a pressure reducing unit, such as an expansion valve of a refrigeration cycle for a vehicle air conditioning, flows into the evaporator 13, and absorbs heat from the blown air to be evaporated, thereby cooling the blown air.

An air mixing door 14 and a hot water type heater core 15 serving as a heat exchanger for heating are disposed at a rear side of the evaporator 13 (on a downstream side of an air flow). The air mixing door 14 is constructed of a cantilever plate door pivoting on a rotary shaft 14a.

The heater core 15, as well known, heats air by using hot water (i.e., coolant) of a vehicle engine as a heat source. The heater core 15 is also arranged approximately longitudinally such that the air inflow and outflow surfaces of a core portion 15a extend in the up-down direction.

On the other hand, a cold air passage 16 is formed on a front side part of the upper end of the heater core 15 in the case 11. The air (cold air) having passed through the evaporator 13 bypasses the heater core 15 through the cold air passage 16 as indicated by the broken arrow "b" in FIG. 1.

The air mixing door 14 is turned and rotated in the up-down direction of the vehicle between the evaporator 13 and the heater core 15 to open or close an inlet air passage 17 of the heater core 15 and the cold air passage 16. This can adjust the ratio of an amount of warm air (arrow "a") heated by the heater core 15 through the heater core inlet air passage 17 to an amount of cold air (arrow "b") passing through the cold air passage 16, thereby adjusting the temperature of air blown into the passenger compartment. Therefore, the air mixing door 14 serves as temperature adjustment means for adjusting the temperature of air blown into the passenger compartment.

The rotary shaft 14a of the air mixing door 14 is rotatably supported by bearing holes (not shown) provided in left and right side walls of the case 11. One end of the rotary shaft 14a is protruded out from the case 11 and is connected to an air mixing door operating mechanism. An actuator mechanism using a motor is usually employed as the air mixing door operating mechanism, but in place of the actuator mechanism, a manually operated mechanism may be employed.

A warm air guide wall 11d is integrally formed with the upper division cases 11a and 11b of the case 11 at a specified spacing at a rear side of the heater core 15, and a warm air passage 18 is formed between the warm air guide wall 11d and the heater core 15. The warm air passing through the heater core 15 is guided by the warm air guide wall 11d, thereby flowing through the warm air passage 18 toward the upper side of the vehicle. An upper bent end portion 11e that is bent toward the vehicle front side is formed at the upper part of the warm air guide wall 11d. As shown in FIG. 1, the warm air guide wall 11d has an extending part extending approximately vertically, in parallel with the heater core 15.

Since the warm air from the warm air passage 18 is guided to the vehicle front side by the upper bent end portion 11e, the warm air collides against and is joined with the cold air flowing upward through the cold air passage 16 as indicated by arrow "b", thereby enhancing the mixing of the cold air and the warm air. Thus, an air mixing portion 19 in which the cold air and the warm air are mixed is formed above the cold air passage 16.

A defroster opening 20 is opened at a position on the front side of the vehicle in the top surface of the case 11, and a center face opening 21a and side face openings 21b, 21c are opened at positions on the vehicle rear side of the defroster opening 20 in the top surface of the case 11. The side face openings 21b, 21c are located on both left and right sides of the center face opening 21a as shown in FIG. 7 to be described later.

A flow path of the center face opening 21a and flow paths of the left and right side face openings 21b, 21c are separated by left and right partition walls 11*f* (see FIG. 7) which are integrally formed with the upper division cases 11*a*, 11*b* of the case 11. FIGS. 1 to 3 show only the lower end of the partition wall 11*f*. The shape of any of the defroster opening 20 and the face openings 21*a*, 21*b*, 21*c* is rectangular as viewed from the above, for example.

The defroster opening 20 is made so as to blow off the conditioned air from the above-described air mixing portion 19 toward the inner surface of the vehicle windshield. The center face opening 21*a* is made so as to blow off the conditioned air from the air mixing portion 19 toward the passenger's upper body at the center in the left-right direction of the vehicle dashboard.

In contrast, the side face openings 21*b*, 21*c* are made so as to blow off the conditioned air at both left and right ends of the vehicle dashboard toward the passenger's upper body on the window side or the inner surface of the window pane on the vehicle side.

Furthermore, a foot opening 22 is provided at the upper part of the upper bent end portion 11*e* of the warm air guide wall 11*d* inside the case 11. Thus, the foot opening 22 is disposed on the vehicle rear side of the face openings 21*a*, 21*b*, 21*c*.

The foot opening 22 guides the conditioned air from the air mixing portion 19 to front seat-side left and right foot air outlet ports 24*a* and a rear seat-side foot air outlet port 24*b* via a foot air outlet passage 23. The front seat-side left and right foot air outlet ports 24*a* blow off the conditioned air toward the foot area of the passengers on the front seat (a driver and a front-seat passenger). The rear seat-side foot air outlet port 24*b* blows off the conditioned air toward the foot area of a back passenger via a rear seat-side foot air duct (not shown).

In this embodiment, an air-outlet mode selecting mechanism is constructed of the two first and second rotary doors 25, 26. The foot opening 22 is opened and closed by the first rotary door 25, and the defroster opening 20 and the center face opening 21*a* are opened and closed by the second rotary door 26.

A communication passage 27 is formed adjacent to the vehicle front side of the foot opening 22. The opening degree of the communication passage 27 is adjusted by the first rotary door 25. The communication passage 27 is formed over the entire area in the left-right direction of the vehicle within the case 11. More specifically, the communication passage 27, as shown in FIG. 7, is constructed of a first communication passage (center communication passage) 27*a* located between the left and right partition walls 11*f*, and second communication passages (both left and right side communication passages) 27*b*, 27*c* located outside the left and right sides of the partition walls 11*f*.

Since as shown in FIG. 7, the center face opening 21*a* is disposed between the left and right partition walls 11*f*, the flow path of the center face opening 21*a* communicates with the air mixing portion 19 via the center communication passage 27*a*.

In contrast, since the left and right side face openings 21*b*, 21*c* are located outside the left and right sides of the left and right partition walls 11*f*, the flow paths of the left and right side face openings 21*b*, 21*c* communicate with the air mixing portion 19 via both left and right communication passages 27*b*, 27*c*.

The opening range of the defroster opening 20, as shown in FIG. 7, is set to extend both over a center part (a range in which the first communication passage 27*a* is formed) located between the left and right partition walls 11*f*, and over a further right area from the right partition wall 11*f* (a range in which the right communication passage 27*c* is formed).

Therefore, in the opening range of the defroster opening 20, an opening range around the center part communicates with the air mixing portion 19 via the center communication passage 27*a*. In the whole opening range of the defroster opening 20, an opening range on the right side communicates with the air mixing portion 19 via the right communication passage 27*c*.

The center communication passage 27*a* is opened and closed by the first rotary door 25, and both left and right communication passages 27*b*, 27*c* constantly communicate with the air mixing portion 19 on a path to be described later, regardless of the rotational position of the first rotary door 25.

Next, the specific construction of the first rotary door 25 will be described below with reference to FIGS. 4 to 8.

Figure 4:
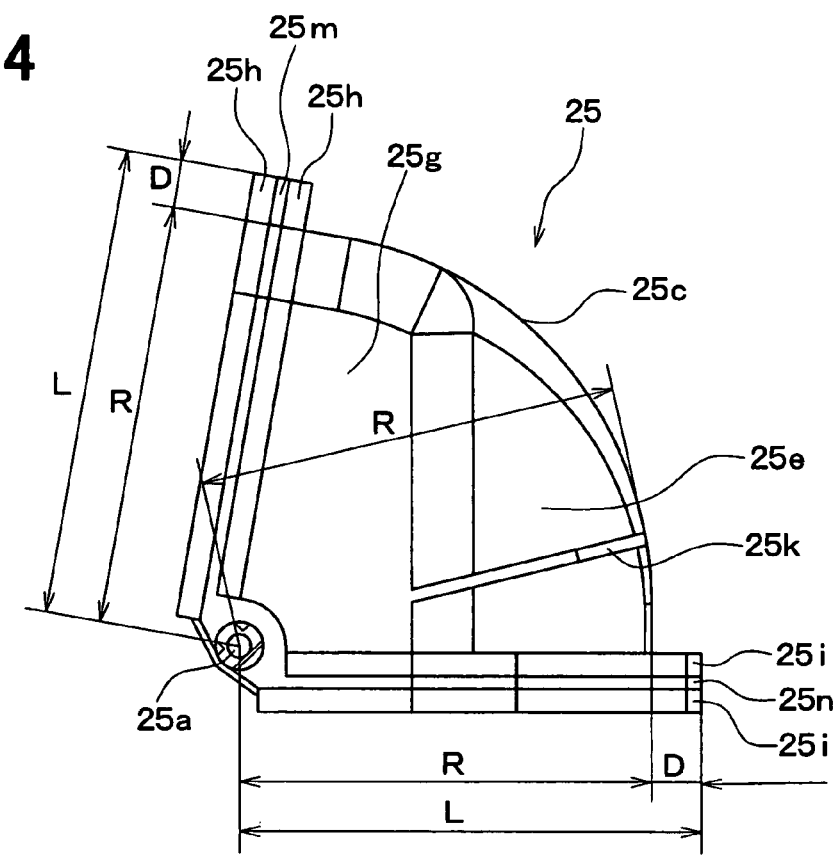
FIG. 4 is a side view showing a first rotary door according to the first embodiment.

The first rotary door 25, as shown in FIG. 4, has a side surface shape that enlarges in a V shape radially outward with the rotary shaft 25*a* being centered. In this side surface shape, parts in the vicinity of the rotary shaft 25*a* form side walls 25*g*, 25*f* perpendicular to the rotary shaft 25*a*.

The rotary shaft 25*a* is formed to protrude from the side walls 25*g*, 25*f* to both left and right sides in the axial direction. Although in this example the rotary shaft 25*a* is formed to penetrate through the entire length of the first rotary door 25 in the axial direction, a center shaft 25*b* located inside the side walls 25*g*, 25*f* of the first rotary door 25 is not always necessary. If there is no problem in strength of the door 25, the center shaft 25*b* of the rotary shaft 25*a* may be withdrawn.

The first rotary door 25 has door surfaces 25*c*, 25*d*, 25*e* integrally formed therewith at positions separated by a predetermined dimension radially outward from the rotary shaft 25*a*. Among these door surfaces 25*c*, 25*d*, and 25*e*, the center door surface 25*c* is located at the center in the door axial direction, and the left and right door surfaces 25*d* and 25*e* are located on both left and right sides (on both sides in the axial direction) of the center door 25*c*.

Figure 5:
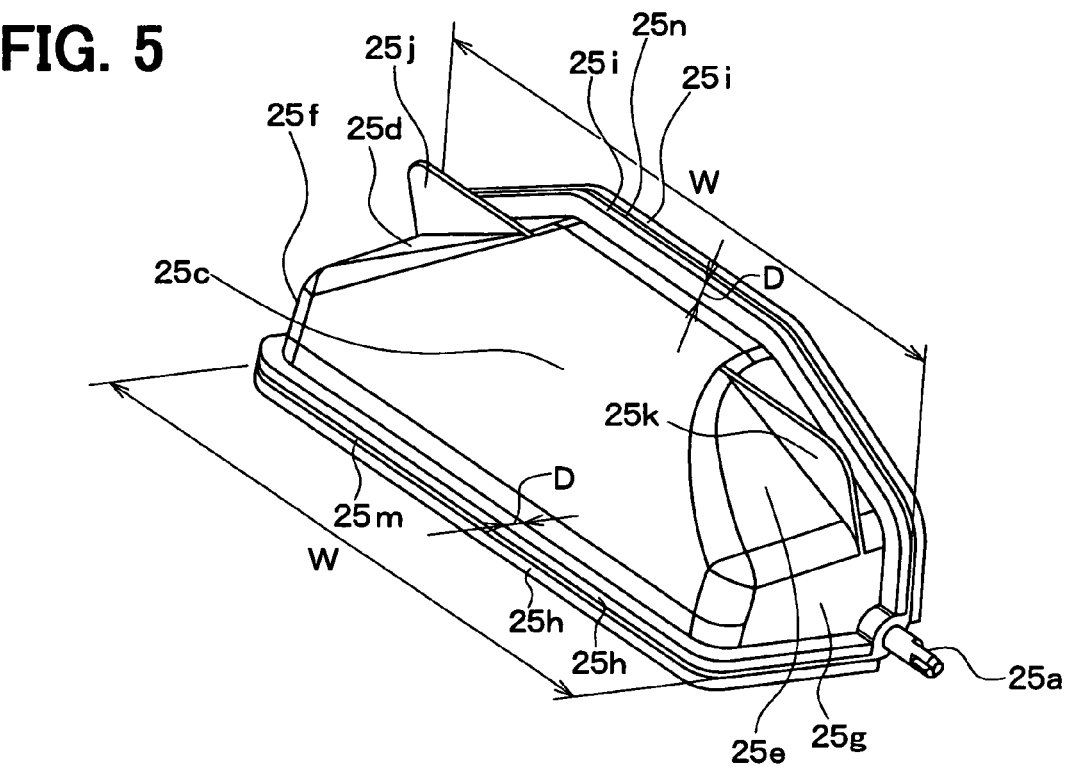
FIG. 5 is a perspective view showing the first rotary door according to the first embodiment.

More specifically, the center door surface 25*c* and the left and right door surfaces 25*d*, 25*e* are formed in a predetermined range from one end on the foot opening 22 side in the circumferential direction of the door surface of the first rotary door 25 (the right end shown in FIGS. 1 and 5, or the lower end shown in FIG. 4) toward the other end on the non-foot opening side (the left end shown in FIGS. 1 and 5, or the upper left end shown in FIG. 4).

The center door surface 25*c* is formed in an arc shape with a certain radius R (see FIG. 4) from one end on the foot opening side in the circumferential direction of the door surface to the other end on the non-foot opening side.

In contrast, the left and right door surfaces 25*d* and 25*e* have a smaller dimension in the door radial direction than that of the center door surface 25*c*. More specifically, each of the left and right door surfaces 25*d*, 25*e* is an inclined surface whose dimension in the door radial direction is gradually decreased from the center side of the door axial direction toward the axial ends (i.e., both left and right ends of FIG. 5).

The left and right door surfaces 25*d* and 25*e* each of which is formed in the predetermined range from one end on the foot opening 22 side in the circumferential direction of the door surface nearly to the center position in the door surface circumferential direction. The left and right door surfaces 25*d* and 25*e* are not formed near the end on the non-foot opening side in the circumferential direction of the door surface (see FIGS. 4 and 5). Thus, near the other end on the non-foot opening side in the door surface circumferential direction (in short, the end on the air mixing portion 19 side), the entire area in the door axial direction has an arc shape with the same radius R as that of the center door surface 25*c*.

Furthermore, the left and right door surfaces 25d and 25e are provided integrally with air guides 25j and 25k. The details of the air guides 25j, 25k will be described later.

The rotary shaft 25a, the center shaft 25b, the center door surface 25c, the left and right door surfaces 25d, 25e, the side walls 25f, 25g, and the air guides 25j, 25k, which constitute the first rotary door 25, are integrally formed of resin.

The rotary shaft 25a of the rotary door 25 is disposed in parallel to an arrangement direction (the left-right direction of the vehicle) of the center face opening 21a and the side face openings 21b, 21c. The rotary shaft 25a of the rotary door 25 is disposed near the warm air passage 18 rather than the cold air passage 16, as shown in FIGS. 1 to 3.

The rotary shaft 25a penetrates bearing holes (not shown) on the left and right side walls of the upper division cases 11a, 11b of the case 11 to protrude outside of the case, and is rotatably supported by the bearing holes.

A space inside the first rotary door 25 is always open to a space in the case 11, so that air can freely pass through the space inside the first rotary door 25 in an operation position where the foot opening 22 is open, as indicated by arrow "c" of FIGS. 1 and 2.

Both ends in the circumferential direction of the center door surface 25c, the left and right door surfaces 25d, 25e, and the side walls 25f, 25g of the first rotary door 25 are fixed with seal portions 25h and 25i made of elastic material.

More specifically, flange-shaped protrusions 25m and 25n that protrude vertically from the door surfaces 25c, 25d, 25e and the side walls 25f, 25g are integrally formed on both ends in the circumferential direction of the first rotary door 25.

The seal portions 25h are fixed to both front and back surfaces of the flange-shaped protrusion 25m at the non-foot opening side end, while seal portions 25i are fixed to both front and back surfaces of the flange-shaped protrusion 25n at the foot opening side end. These seal portions 25h and 25i are arranged so as to expand in the V shape from the respective parts of the rotary axis 25a radially outward as shown in FIGS. 4 and 5.

Among both the seal portions 25h and 25i, the seal portion 25h positioned at the non-foot opening side end is bent in a U shape corresponding to an enlarged part of the center door surface 25c formed over the entire area in the door axial direction and the side walls 25f, 25g.

In contrast, the seal portion 25i positioned at the foot opening side end has a bent shape corresponding to the center door surface 25c, the left and right door surfaces 25d, 25e, and the side walls 25f, 25g, that is, such a bent shape to have an inclined portion at a U-shaped edge.

Both the seal portions 25h, 25i are preferably made of thermoplastic elastomer as specific material. The thermoplastic elastomer is melted when being heated at high temperature, thereby exhibiting fluidity, and thus can be injection molded like thermoplastic resin. In contrast, the thermoplastic elastomer, which is material exhibiting the rubber elasticity at normal temperature, can be used to integrally mold and fix both the seal portions 25h, 25i to the door surfaces in manufacturing of the first rotary door 25.

The seal portions 25h and 25i may be individually molded of appropriate elastic material, such as urethane packing material, to be affixed to a door main body of the first rotary door 25.

The seal portions 25h and 25i protrude from the door surface of the first rotary door 25 outward by a predetermined dimension in a lip manner. A protruding height D of the seal portions 25h, 25i from the door surface is constant over the entire area of the seal portions as shown in FIGS. 4 and 5.

Therefore, in FIG. 4, the maximum dimension L in the door radial direction which includes the protrusion height D of the seal portions 25h, 25i is the total of the radius R of the center door surface 25c and the protrusion height D (L=R+D). The W of FIG. 5 means a length in the axial direction of the door main body, which is constructed of the door surfaces 25c, 25d, 25e, and side walls 25f, 25g of the first rotary door 25, including the protrusion height D of the seal portions 25h, 25i.

In contrast, in FIG. 1, an opening 28 is a door upstream opening located at an upstream part of the first rotary door 25, and positioned within a range of the air mixing portion 19. The door upstream opening 28 serves as an inlet of air which is to flow into the inner space of the first rotary door 25 and the communication passages 27 (27a, 27b, 27c).

The door upstream opening 28 has a rectangular shape, more specifically, a rectangle whose long side is one side in the axial direction of the first rotary door 25.

A first seal rib 29 is formed at an opening flange of the door upstream opening 28. The first seal rib 29 is a case-side seal surface, and is integrally formed with the upper division cases 11a, 11b of the case 11.

The first seal rib 29 has a U-like bent shape formed of three sides of a rectangular flange of the door upstream opening 28, except for one side on the rotary shaft 25a side of the first rotary door 25.

When the first rotary door 25 is operated to rotate to a foot mode position shown in FIG. 1, the U-like bent shape of the seal portion 25h at the non-foot opening end of the first rotary door 25 is superimposed (positioned) on the U-like bent shape of the first seal rib 29, causing the seal portion 25h to be pressed against the first seal rib 29.

A second seal rib 30 is formed at an opening flange of the foot opening 22. The second seal rib 30 also constitutes a case side seal surface, and is integrally formed with the upper division cases 11a, 11b of the case 11.

As shown in FIG. 6, the second seal rib 30 has a U-like bent shape formed of three sides of a rectangular opening flange of the foot opening 22, except for one side on the rotary shaft 25a. The maximum dimension L in the door radial direction of the first rotary door 25, that is, the maximum dimension L of the center door surface 25c is greater by a predetermined dimension than the distance (height) H between a protruding tip 30a of the second seal rib 30 and the center of the rotary shaft 25a.

Thus, in the foot mode position shown in FIGS. 1 and 6, at the foot opening side end of the first rotary door 25, a part of the seal portion 25i corresponding to the center door surface 25c is pressed against the second seal rib 30. Also, a part of the seal portion 25i corresponding to the side walls 25f, 25g is pressed against the left and right sides of the second seal rib 30.

The left and right door surfaces 25d, 25e of the first rotary door 25 have an inclined shape in which a dimension in a door radial direction is smaller than that of the center door surface 25c, thereby forming a door outer peripheral opening 31 (space) with a triangle section between the tip of the seal portion 25i of the left and right door surfaces 25d, 25e and the protruding tip 30a of the second seal rib 30. The shaded area in FIG. 6 indicates an opening range of the door outer peripheral opening 31.

The left and right door outer peripheral openings 31 serve to communicate the flow path of the foot opening 22 with the second communication passages 27b, 27c on both left and right sides in the foot mode as indicated by arrows "e", "f", and "g" in FIGS. 6 and 7.

Between the outer peripheries of the door surfaces 25c, 25d, 25e of the first rotary door 25 and the lower end of the partition walls 11f, is inevitably formed a clearance 32 for allowing a rotational operation of the first rotary door 25 (FIGS. 1 and 7). Through the clearance 32, the center communication passage 27a communicates with both the left and right side communication passages 27b and 27c.

Therefore, in the foot mode, as indicated by arrow "e" of FIGS. 1, 6, and 7, the flow path of the fool opening 22 communicates with both the left and right second communication passages 27b, 27c by the door outer peripheral openings 31, and further with the center communication passage 27a via the clearance 32, and then with a center opening area of the defroster opening 20.

The above-described air guides 25j, 25k are disposed in the opening range of the door outer peripheral opening 31. The air guides 25j, 25k each are constructed of a plate-like member directed toward the door axial direction on the outer peripheries of the left and right door surfaces 25d, 25e. The plate-like member forms the tip surface along the protruding tip 30a of the second seal rib 30, and protrudes in a triangle shape from each of the inclined surfaces of the left and right door surfaces 25d, 25e.

Reference numeral M of FIG. 6 indicates a distance between the tip surface of each of the air guides 25j, 25k and the protruding tip 30a of the second seal rib 30. The formation position of each of the air guides 25j, 25k is set to a position apart from the formation position of the second seal rib 30 toward the downstream side of an air flow indicated by arrow "e", as shown in FIG. 1.

The door surface positioned at the non-foot opening side end of the first rotary door 25 is formed in an arc shape with the same radius R as that of the center door 25c over the entire area in the axial direction, so that the non-foot opening side end of the first rotary door 25 has the maximum dimension L in a door radial direction, over the entire area in the axial direction. Thus, when the first rotary door 25 is operated to rotate to the position where the foot opening 22 is closed (for example, a defroster mode position of FIG. 3), the U-like bent shape of the seal portion 25h at the non-foot opening side end of the door 25 is superimposed on and pressed against the entire area of the U-like bent shape of the second seal rib 30.

In the defroster mode position of the first rotary door 25, the seal portion 25i of the foot opening side end is pressed against the upper surface (seal surface of the case side) of the upper bent end portion 11e of the warm air guide 11d. Thus, the foot opening portion 22 can be completely closed by the first rotary door 25.

Next, the second rotary door 26 will be described below. The second rotary door 26 is operated to rotate with the rotary shaft 26a centered thereby to open and close the defroster opening 20 and the center face opening 21a as described above.

As mentioned above, the center face opening 21a is provided between the left and right partition walls 11f of the case 11. In contrast, the opening range of the defroster opening 20 is set to lie both over the center opening area positioned between the left and right partition walls 11f and over the right opening area positioned on the further right side of the right partition wall 11f.

In the second rotary door 26, the door surface 26c corresponding to the center door surface 25c of the first rotary door 25 is disposed between the left and right partition walls 11f as shown in FIG. 7, and a plate-like door member 26h is disposed in the right opening area in the opening range of the defroster opening 20.

The door surface 26c is formed in a simple arc shape having a constant radius with the rotary shaft 26a centered. Both ends of the door surface 26c in the axial direction are connected to the rotary shaft 26a via side walls 26d, 26e formed in a fan shape. A part of the door surface 26c opens and closes the center opening area of the defroster opening 20 and the center face opening 21a.

The plate-like door member 26h has a structure with one end of the plate-like member directly connected to the rotary shaft 26a as shown in FIG. 7 (see a second embodiment in FIG. 10 to be described later). The plate-like door member 26h is operated to be rotated together with the rotary shaft 26a centered, thereby opening and closing the right opening area of the defroster opening 20.

The rotary shaft 26a, the door surface 26c, the side wall 26d, and the plate-like door member 26h, for constituting the second rotary door 26, are integrally molded of resin. Seal portions 26f, 26g (FIGS. 1 to 3) of the second rotary door 26, corresponding to the structures of the seal portions 25h, 25i of the first rotary door 25, are also integrally fixed to the second rotary door 26.

The rotary shaft 26a of the second rotary door 26 penetrates the left and right partition walls 11f and the left and right side walls of the case 11 to protrude outside the case 11 as shown in FIG. 7.

The first and second rotary doors 25, 26 are operated in communication with each other by a common air-outlet mode door operation mechanism (not shown). More specifically, any one of both left and right protruding ends of the rotary shaft 25a of the first rotary door 25, and any one of both left and right protruding ends of the rotary shaft 26a of the second rotary door 26 are connected to the common air-outlet mode door operation mechanism via a link mechanism (not shown) outside the left and right side walls of the case 11.

As the air-outlet mode door operation mechanism, an actuator mechanism using a motor is normally employed, but a manual operation mechanism and not the actuator mechanism may be used.

Next, an operation of the first embodiment with the above-described arrangement will be described. FIG. 1 shows the foot mode, wherein the first rotary door 25 is operated to rotate to the most front side position of the vehicle, and the entire U-like bent shape of the seal portion 25h on the non-foot opening side (on the front side) of the first rotary door 25 is pressed against the first seal rib 29 of the inner wall of the case 11.

Thus, the door upstream opening 28 communicates only with the flow path of the fool opening 22 through the inside space of the first rotary door 25 as indicated by arrow "c" of FIG. 1.

At this time, among the seal portion 25i on the foot opening 22 side (rear side) of the first rotary door 25, a part of the seal portion 25i provided in the center door surface 25c is pressed against the second seal rib 30 as shown in FIG. 6. This interrupts the communication between the flow path of the foot opening 22 and the first communication passage 27a positioned at the center of the case.

The left and right door surfaces 25d, 25e of the first rotary door 25 are inclined surfaces having a smaller dimension in the radial direction than that of the center door surface 25c, so that the door outer peripheral opening 31 is formed between parts of the seal portions 25i provided in the left and right door surfaces 25d, 25e and the second seal rib 30 as indicated by the diagonally shaded area in FIG. 6.

The flow path of the foot opening 22 communicates through the door outer peripheral opening 31 with the second communication passages 27b, 27c positioned on both left and right sides of the case. Therefore, the flow path of the foot opening 22 communicates with the left and right side face openings 21b, 21c via both left and right communication passages 27b, 27c (see the arrow "d" in FIGS. 6 and 7).

The second communication passages 27b, 27c, as indicated by arrow "e" in FIG. 7, pass through the clearance 32 under the partition walls 11f to communicate with the first communication passage 27a at the center of the inside of the case 11.

On the other hand, in the foot mode, the second rotary door 26 is operated to rotate to the most rear side position of the vehicle as shown in FIG. 1, and completely closes the center face opening 21a by the arc-shaped door surface 26c, while fully opening the center opening area of the defroster opening 20 (corresponding to the first communication passage 27a).

At the same time, by the plate-like door member 26h of the second rotary door 26 (indicated by the broken line in FIG. 7), the right opening area of the defroster opening 20 (corresponding to the right communication passage 27c) is fully opened. Thus, both the center opening area and the right opening area of the defroster opening 20 communicate with the flow path of the foot opening 22 via the first and second communication passages 27a, 27b, 27c.

The second rotary door 26 opens and closes only the center face opening 21a and the defroster opening 20, and does not relate to opening and closing of the side face openings 21b, 21c. The communication state between the left and right side face openings 21b, 21c and both the left and right communication passages 27b, 27c is maintained in the whole air-outlet mode.

The foot mode is used mainly for blowing off warm air toward the passenger's foot area in heating operation. Therefore, in the foot mode, the air mixing door 14 is normally operated to a maximum heating position where the inlet air passage 17 of the heater core 15 is fully open and the cold air passage 16 is completely closed, or to an intermediate temperature control position where the cold air passage 16 is opened to a small degree and the opening degree of the inlet air passage 17 of the heater core 15 is smaller than that of the fully open state.

FIG. 1 shows a state in which the air mixing door 14 is operated to the maximum heating position. Thus, as indicated by arrow "a" of FIG. 1, the entire cooled air having passed through the evaporator 13 flows from the inlet air passage 17 into the core portion 15a of the heater core 15, and is heated to become warm air.

When the air mixing door 14 is operated to an intermediate temperature control position, a part of the cold air having passed through the evaporator 13, as indicated by arrow "a" in FIG. 1, flows from the inlet air passage 17 into the core portion 15a of the heater core 15, and is heated to become warm air. This warm air passes through the warm air passage 18 to be directed toward the air mixing portion 19. The other part of the cold air having passed through the evaporator 13, as indicated by arrow "b" in FIG. 1, passes through the cold air passage 16 to be directed toward the air mixing portion 19 as it is.

In the air mixing portion 19, the cold air and the warm air are mixed, so that the temperature of the warm air is adjusted to a desired temperature. Most of the warm air at the desired temperature passes through the door upstream opening 28, the inside space of the first rotary door 25, the foot opening 22, and the foot air outlet passage 23 as indicated by arrow "c" of FIG. 1, and then is blown off from the left and right foot air outlet ports 24a on the front seat side toward the foot area of the passenger on the front seat. At the same time, part of the warm air in the foot air outlet passage 23 is blown off from the foot air outlet port 24b on the rear seat side toward the foot area of the passenger on the rear seat via the rear seat side foot duct not shown.

On the other hand, as mentioned above, the flow path of the foot opening 22 communicates with both the left and right second communication passages 27b, 27c in the case by the door outer peripheral opening 31 (see FIG. 6) above the left and right door surfaces 25d, 25e of the first rotary door 25, and then communicates with the left and right side face openings 21b, 21c via the second communication passages 27b, 27c. At the same time, the flow path of the foot opening 22 communicates with the first communication passage 27a at the center part of the case via both left and right second communication passages 27b, 27c as mentioned above.

Therefore, a part of the warm air reaching the flow path of the foot opening 22 flows into the left and right side face openings 21b, 21c through the left and right second communication passages 27b, 27c as indicated by arrow "d" in FIGS. 6 and 7. This warm air passes through the left and right side face openings 21b, 21c, and then is blown off from the side face air outlet ports (not shown) positioned on both left and right ends of the vehicle dashboard (instrument panel) toward the passenger's upper body on the window pane side or toward the inner surface of the window pane on the side of the vehicle.

This can eliminate the feel of coldness around the passenger's shoulder which may be caused due to the low temperature of the window pane on the side of the vehicle, thereby exhibiting the defrosting effect of the window pane on the vehicle side.

The other part of the warm air reaching the flow path of the foot opening 22 passes through the door outer peripheral opening 31 and the first and second communication passages 27a, 27b, 27c to flow into the defroster opening 20 as indicated by arrows "e", "f", and "g" in FIGS. 6 and 7. The warm air having passed through the defroster opening 20 is blown from the defroster air outlet port not shown to the inner surface of the vehicle windshield, thereby exhibiting the defrosting effect of the vehicle windshield. The arrows "e" and "f" indicate the flow of warm air directed toward the center opening area of the defroster opening 20, and the arrow "g" indicates the flow of warm air directed toward the right opening area of the defroster opening 20.

In order for the passenger to feel comfortable and warm at chilly time in winter season, a side face blown-air amount, that is, an amount of air blown from the side face openings 21b, 21c in the foot mode should be greater than a defroster blown-air amount, that is, an amount of air blown from the defroster opening 20.

This is for the following reason. That is, first, when the defroster blown-air amount is much, the warm air blown from the defroster rises along the inner surface of the vehicle windshield, inducing a hot flush in the passenger's head, which causes the passenger to lose comfort.

Secondly, when the side face blown-air amount is insufficient, the feel of heating around the shoulder of the passenger's upper body on the window pane side becomes short. Thus, the passenger feels cold around the shoulder on the window pane side to lose comfort.

For the above-described reason, the side face blown-air amount may be greater than the defroster blown-air amount. Specifically, the ratio of the defroster blown-air amount to the side face blown-air amount may be preferably about 0.7:1.

It is apparent that in the foot mode, the foot blown-air amount (sum of amounts of air blown from the foot air outlet ports 24a, 24b) is maximum. Specifically, the ratio of each air amount to the total blown-air amount including the foot blown-air amount is preferably as follows: the ratio of the side face blown-air amount to the latter is about 0.15-0.20; the ratio of the defroster blown-air amount thereto is about 0.10-0.15; and the foot blown-air amount is residue (the ratio of this amount thereto is 0.65-0.75).

However, in fact, with the arrangement of the side face openings 21b, 21c and the defroster opening 20, the defroster blown-air amount tends to be greater than the side face blown-air amount.

In other words, the defroster opening 20 is an opening for the conditioned air outlet to the inner surface of the vehicle windshield, and thus is disposed on the vehicle front side of the side face openings 21b, 21c and the center face opening 21a.

For this reason, as viewed from the flow path of the foot opening 22, the side face openings 21b, 21c are disposed before the defroster opening 20. Thus, in order to allow the warm air in the flow path of the foot opening 22 to flow into the side face openings 21b, 21c, the warm air needs to be sharply bent at a right angle and then to flow (see the arrow "d" in FIG. 1).

In contrast, as viewed from the flow path of the foot opening 22, the defroster opening 20 is disposed back of the side face openings 21b, 21c (on the vehicle front side), so that the warm air of the foot opening 22 can proceed smoothly along the outer peripheral surface of the left and right door surfaces 25d, 25e of the first rotary door 25 as indicated by arrow "e" in FIG. 1.

Such a difference in warm air form makes the pressure drop of the flow path on the side face openings 21b, 21c greater than that of the flow path of the defroster opening 20, so that the defroster blown-air amount tends to be greater than the side face blown-air amount.

For this reason, in the embodiment, the air guides 25j, 25k are disposed on the outer peripheries of the left and right door surfaces 25d, 25e. Each of the air guides 25j, 25k is constructed of a plate-like member directed in the door axial direction, and are disposed in the opening range of the door outer peripheral opening 31.

Thus, the air guides 25j, 25k prevent the warm air flow of the door outer peripheral opening 31 from going straight toward the defroster opening 20, thereby exhibiting a guiding effect of distributed air so as to guide the warm air flow of the door outer peripheral opening 31 to the side face openings 21b, 21c.

Thus, the ratio of the warm air flow directed toward the side face openings 21b, 21c to the warm air flow of the door outer peripheral opening 31 can be greater than that of the warm air flow directed toward the defroster opening 20 to the warm air flow of the door outer peripheral opening 31.

Figure 8:
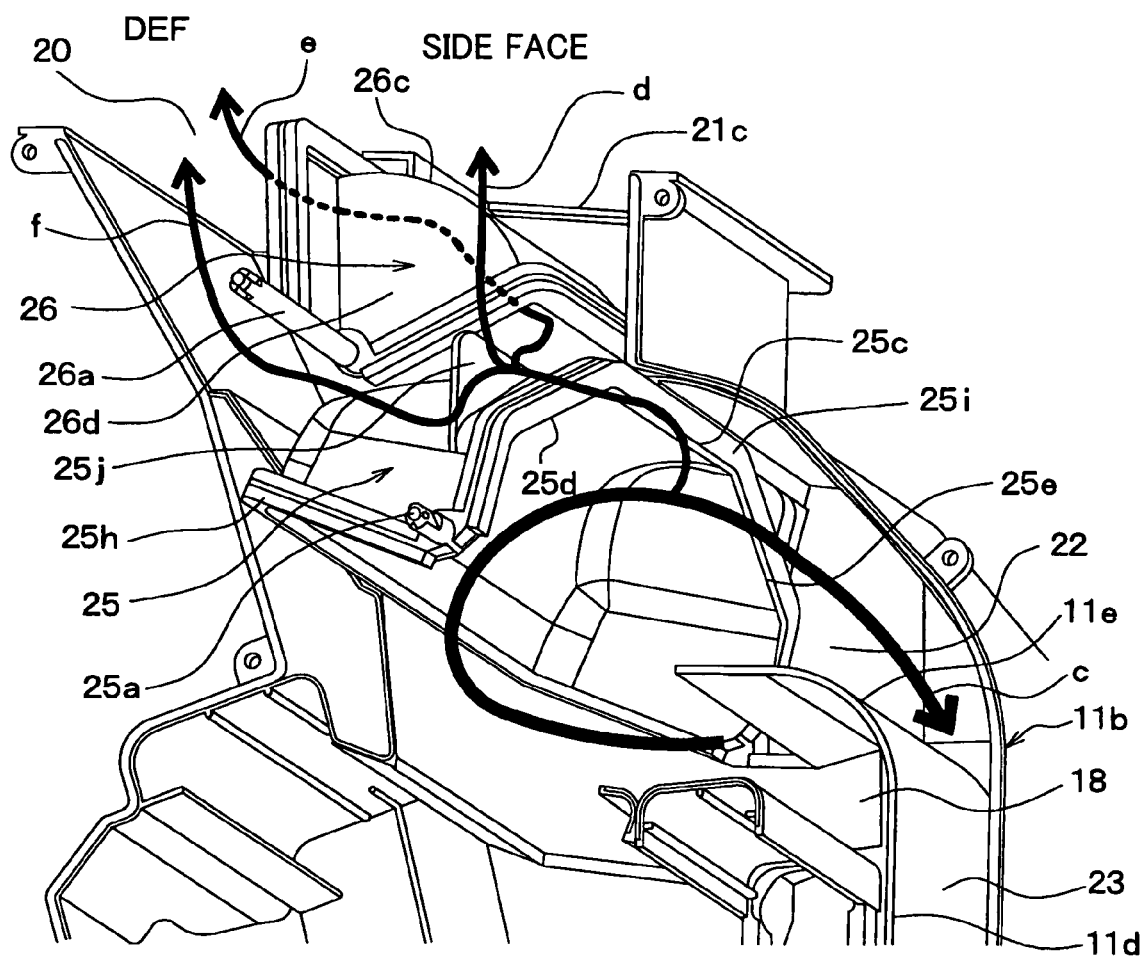
FIG. 8 is a schematic perspective view showing a part of the air conditioning unit according to the first embodiment.

Now, the warm air guiding effect by the air guides 25j, 25k will be described specifically based on FIGS. 6 to 8. Since the plate surfaces of the air guides 25j, 25k are disposed perpendicular to the front surface of the warm air flow which flows from the flow path of the foot opening 22 into the door outer peripheral opening 31, the warm air flow is first guided upward by the plate-like members of the air guides 25j, 25k as indicated by arrow "d" to be directed toward the left and right side face openings 21b, 21c. This can direct the main warm air flow of the door outer peripheral opening 31 toward the side face openings 21b, 21c.

In contrast, a part of the warm air flow of the door outer peripheral opening 31 goes around the case center side end by the guiding effect of the air guides 25j, 25k as indicated by arrow "e", and then is directed to the center opening area of the defroster opening 20. A part of the warm air flow of the left door outer peripheral opening 31 goes around the case left side end by the guiding effect of the left air guide 25j as indicated by arrow "f", and then is directed to the center opening area of the defroster opening 20.

Furthermore, a part of the warm air flow of the right door outer peripheral opening 31 goes around the case right side end by the guiding effect of the right air guide 25k as indicated by arrow "g", and then is directed to the right opening area of the defroster opening 20.

With this arrangement, the side face blown-air amount can be greater than the defroster blown-air amount, so that the comfortable heating can be obtained in the foot mode.

A link mechanism or the like connected to the first rotary door 25 has looseness to some extent. When the first rotary door 25 receives air pressure in the foot mode position shown in FIG. 1, the first rotary door 25 rotates in a range of the looseness of the link mechanism or the like, resulting in variations in the stopped position of the first rotary door 25.

However, in the embodiment, the above-described door outer peripheral opening 31 is formed not in the rotational direction (in the circumferential direction) of the first rotary door 25, but radially outside of the left and right door surfaces 25d, 25e of the first rotary door 25. Even if the first rotary door 25 receives air pressure to rotate to some degree, the size or dimension of the door outer peripheral opening 31 does not change substantially.

Therefore, the appropriate distribution of the foot blown-air amount from the foot opening 22 that is preset in the foot mode and the amounts of air blown from the side face openings 21b, 21c and the defroster opening 20 (the total blown air from the side face and defroster) can be surely maintained.

In addition, a part of the warm air after reaching the foot opening 22 can be branched into the door outer peripheral opening 31. Thus, the warm air after sufficiently being mixed with the cold air can also flow into the side face openings 21b, 21c, and the defroster opening 20, like the foot opening 22.

As a result, there does not occur a phenomenon in which the cold air having passed through the evaporator 13 flows directly from the cold air passage 16 into the flow paths on the side face openings 21b, 21c side and on the defroster opening 20 side.

Therefore, it can prevent a phenomenon in which the temperature of air blown from the side face opening and the temperature of air blown from the defroster opening are drastically decreased in the foot mode, thereby setting an appropriate difference between the upper and lower blown-air temperatures, that is, between the side face and defroster blown-air temperature and the foot blown-air temperature. This can ensure the defrosting effect of the vehicle windshield, while enabling comfortable heating of the passenger's foot area and upper body on the window pane side.

Next, the foot/defroster mode shown in FIG. 2 will be described. In this foot/defroster mode, the first rotary door 25 is operated to rotate from the most front side position of the vehicle shown in FIG. 1 to the vehicle rear side by a predetermined angle, and then transferred to an intermediate position between the most front side position shown in FIG. 1 and the most rear side position shown in FIG. 3. Thus, the front seal portion 25h of the first rotary door 25 is opened and separated from the first seal rib 29 of the case 11, and the rear seal portion 25i is opened and separated from the second seal rib 30 of the case 11.

At this time, the second rotary door 26 is maintained in the same vehicle rear position as that in the foot mode, so that the center face opening 21a is completely closed and the defroster opening 20 is fully open.

The movement of the first rotary door 25 to the intermediate position forms air flows (see the arrows "h" and "i" in FIG.

2) directly proceeding to the communication passages 27*a*, 27*b*, 27*c* through the door upstream opening 28 from the air mixing portion 19. Among the air flows, the arrow "h" indicates an air flow directed toward the defroster opening 20, and the arrow "i" indicates an air flow directed toward the side face openings 21*b*, 21*c*.

Furthermore, the movement of the first rotary door 25 to the intermediate position causes the air guides 25*j*, 25*k* on the left and right doors 25*d*, 25*e* of the first rotary door 25 to move to positions on the foot opening 22 side away from the second seal rib 30. Thus, in the foot/defroster mode, the air guides 25*j*, 25*k* do not exhibit the guiding effect of the air flow into the side face openings 21*b*, 21*c*.

In the foot/defroster mode of the first rotary door 25, large parts of the left and right door surfaces 25*d*, 25*e* move to positions on the foot opening 22 side away from the second seal rib 30, whereby an area of opening of the door outer peripheral opening 31 on the left and right door surfaces 25*d*, 25*e* is brought into a substantially "0" state. This eliminates the air flow from the flow path of the foot opening 22 through the door outer peripheral opening 31 toward the defroster opening 20 and the side face openings 21*b*, 21*c* (the air flow as indicated by arrows "d" and "e" in FIG. 1).

Therefore, the substantially entire amount of warm air reaching the foot opening 22 passes through the foot air outlet passage 23, and then is blown off from the left and right foot air outlet ports 24*a* on the front seat side and from the foot air outlet port 24*b* on the rear seat side toward the passenger's foot area, thereby heating the inside of the passenger compartment.

When the first rotary door 25 is located in a rotational position in the foot/defroster mode, as shown in FIG. 2, the flow path of the air flow "h" for directly proceeding from the air mixing portion 19 to the defroster opening 20 is fully opened as shown in FIG. 2, whereas the opening degree of the flow path of each of the air flows "i" directed toward the side face openings 21*b*, 21*c* is limited to one half or less by the first rotary door 25.

As a result, the defroster blown-air amount from the defroster opening 20 can be increased to the same extent as the foot blown-air amount from the foot opening 22. This can increase the defroster blown-air amount in the foot/defroster mode as compared with in the foot mode, thereby improving the defrosting performance of the vehicle windshield more than in the foot mode.

Also in the foot/defroster mode, a part of air (warm air) of the air mixing portion 19 can directly flow into both left and right side face openings 21*b*, 21*c* through the left and right communication passages 27*b*, 27*c* as indicated by arrow "i". Therefore, the air (warm air) of the side face openings 21*b*, 21*c* is blown from side face air outlet ports (not shown) on both left and right ends of the vehicle dashboard (instrument panel) to the inner surface of the vehicle side window pane or to the passenger's upper body on the window pane side, thereby exhibiting the defrosting effect of the window pane on the vehicle side or the heating effect of the passenger's upper body on the window pane side.

The ratio of the side face blown-air amount from the side face openings 21*b*, 21*c* in the foot/defroster mode to the whole blown air amount is about 0.15 to 0.20, like in the foot mode.

FIG. 3 shows the defroster mode in which the foot opening 22 is completely closed and the defroster opening 20 is fully opened. In the defroster mode, the first rotary door 25 is operated to rotate to the vehicle rear side further away from the intermediate position shown in FIG. 2 by a predetermined angle, so that the first rotary door 25 is moved to the most rear position of the vehicle. At this most rear position of the vehicle of the first rotary door 25, the front side seal portion 25*h* in the first rotary door 25 can be pressed against the entire area of the second seal rib 30. At the same time, the rear side seal portion 25*i* in the first rotary door 25 can be pressed against the front surface (case side seal surface) of the upper bent end portion 11*e* of the warm air guide wall 11*d*.

Thus, the foot opening 22 is completely closed by the first rotary door 25, interrupting the air flow directed from the air mixing portion 19 to the flow path of the foot opening 22.

In contrast, the second rotary door 26 is maintained to the same position as that in the foot mode and in the foot/defroster mode with the center face opening 21*a* being completely closed and the defroster opening 20 being fully opened.

Most of air (warm air) of the air mixing portion 19 flows from the center communication passage 27*a* to the center opening area of the defroster opening 20 as indicated by arrow "h". At the same time, part of air (warm air) of the air mixing portion 19 flows from the right communication passage 27*c* to the right opening area of the defroster opening 20.

The air (warm air) of the defroster opening 20 is blown off from a defroster air outlet port not shown to the vehicle windshield. Thus, the defroster blown-air amount can be increased to a maximum extent, and the defrosting effect on the vehicle windshield side can be increased to a maximum degree.

Also, in the defroster mode, part of air (warm air) of the air mixing portion 19 flows into both left and right side face openings 21*b*, 21*c* via left and right communication passages 27*b*, 27*c* as indicated by the broken arrow "i". The warm air is blown off from the side face air outlet ports (not shown) disposed on both left and right ends of the vehicle dashboard (instrument panel) to the inner surface of the window pane on the vehicle side or the passenger's upper body on the window pane side. This improves the defrosting effect of the window pane on the vehicle side or the heating effect of the passenger's upper body on the window pane side.

Then, when the second rotary door 26 is operated to rotate fully to the vehicle front side in FIG. 3, the defroster opening 20 can be completely closed, and the center face opening 21*a* can be fully opened by the second rotary door 26, with only the center face opening 21*a* and both the left and right side face openings 21*b*, 21*c* being opened. Thus, the conditioned air (mainly, the cold air) of the air mixing portion 19 flows only into the center face opening 21*a* and both the left and right side face openings 21*b*, 21*c*, thereby setting the face mode.

Furthermore, when the second rotary door 26 is operated to rotate to the vehicle front side in FIG. 2 by a predetermined angle, the defroster opening 20 can be completely closed, and the center face opening 21*a* can be fully opened by the second rotary door 26, while the center face opening 21*a* and both the left and right side face openings 21*b*, 21*c* are opened. At this time, the foot opening 22 is opened. This can set a bi-level mode in which the conditioned air is blown off both to the passenger's upper body side and the passenger's foot side at the same time.

Second Embodiment

A second embodiment of the present invention will be now described with reference to FIGS. 9 to 16.

In the above-described first embodiment, in the foot mode, the air guides 25*j*, 25*k* are provided on the left and right door surfaces 25*d*, 25*e* of the first rotary door 25, so that the amount of air blown from the side face openings is greater than the amount of air blown from the defroster opening in the foot mode. In the second embodiment, without providing such air guides 25j, 25k described in the first embodiment, a side face blown-air amount blown toward the side upper side of the passenger compartment is set greater than a defroster blown-air amount blown toward the front windshield during the foot mode.

Figure 14:
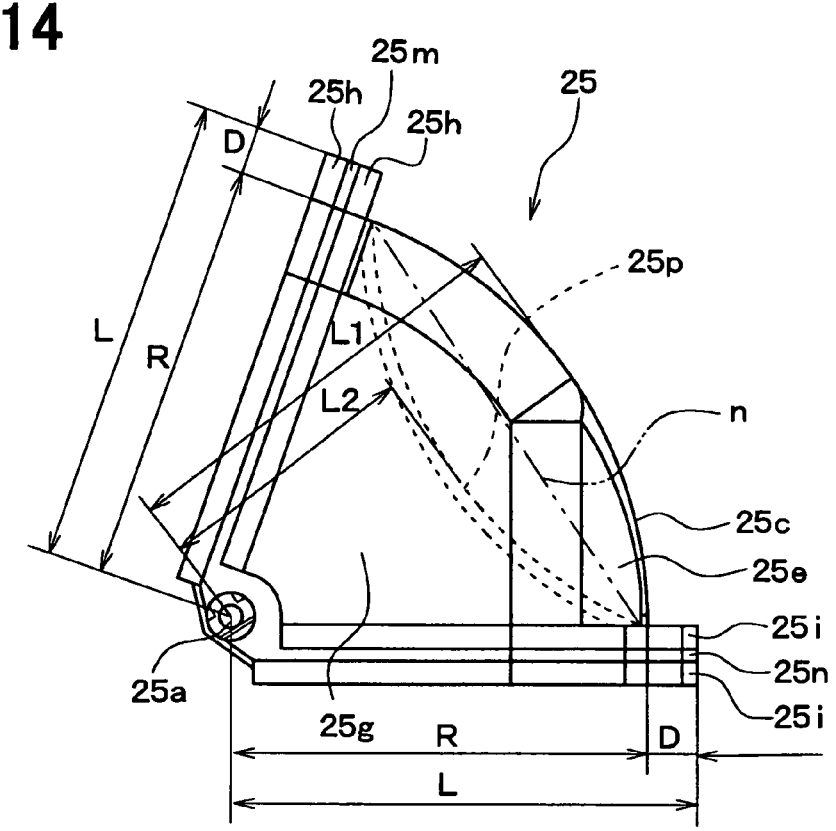
FIG. 14 is a side view showing a first rotary door according to the second embodiment.
Figure 15:
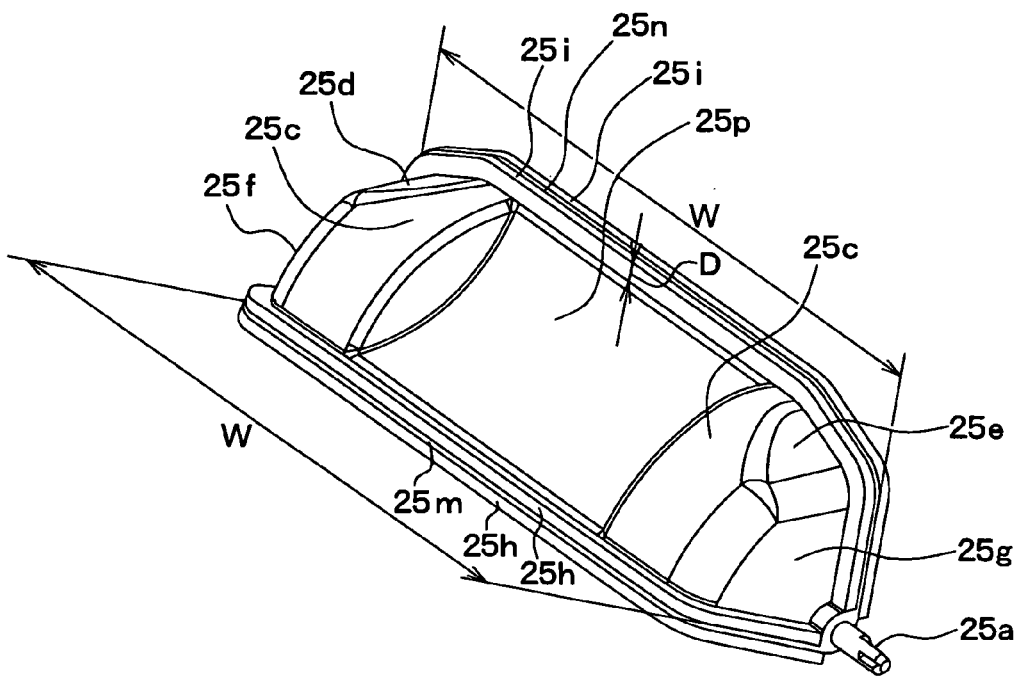
FIG. 15 is a perspective view showing the first rotary door according to the second embodiment.

In the second embodiment, as shown in FIGS. 14 and 15, the left and right door surfaces 25d, 25e are formed in an inclined shape on both left and right sides of the center door surface 25c in the first rotary door 25, like the first embodiment.

Therefore, even in the second embodiment, in the foot mode position of the first rotary door 25, the door outer peripheral opening 31 (see FIG. 10) is formed between the left and right door surfaces 25d, 25e and the second seal rib 30.

Figure 11:
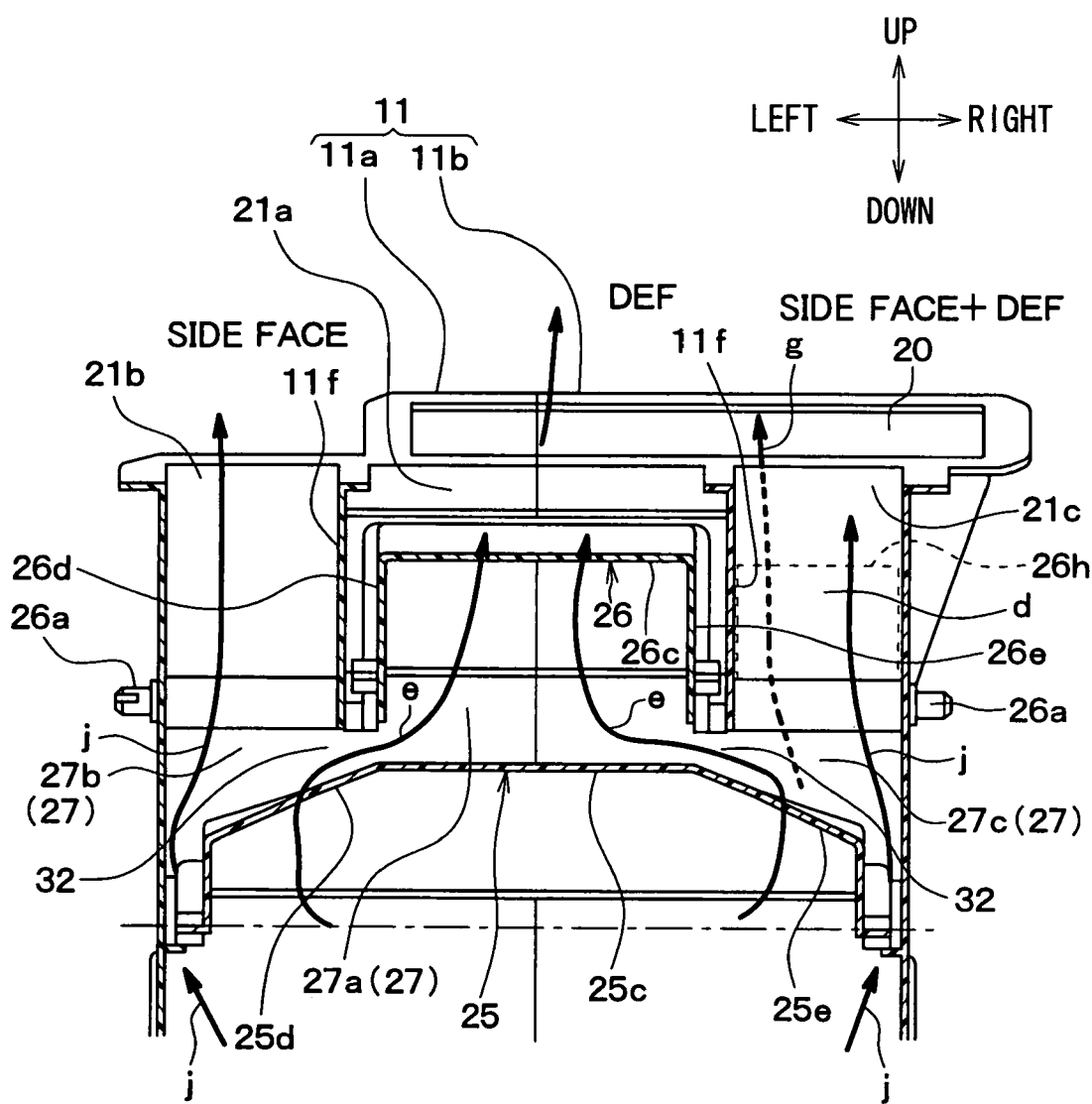
FIG. 11 is a cross-sectional view taken along line XI-XI of FIG. 10.
Figure 12:
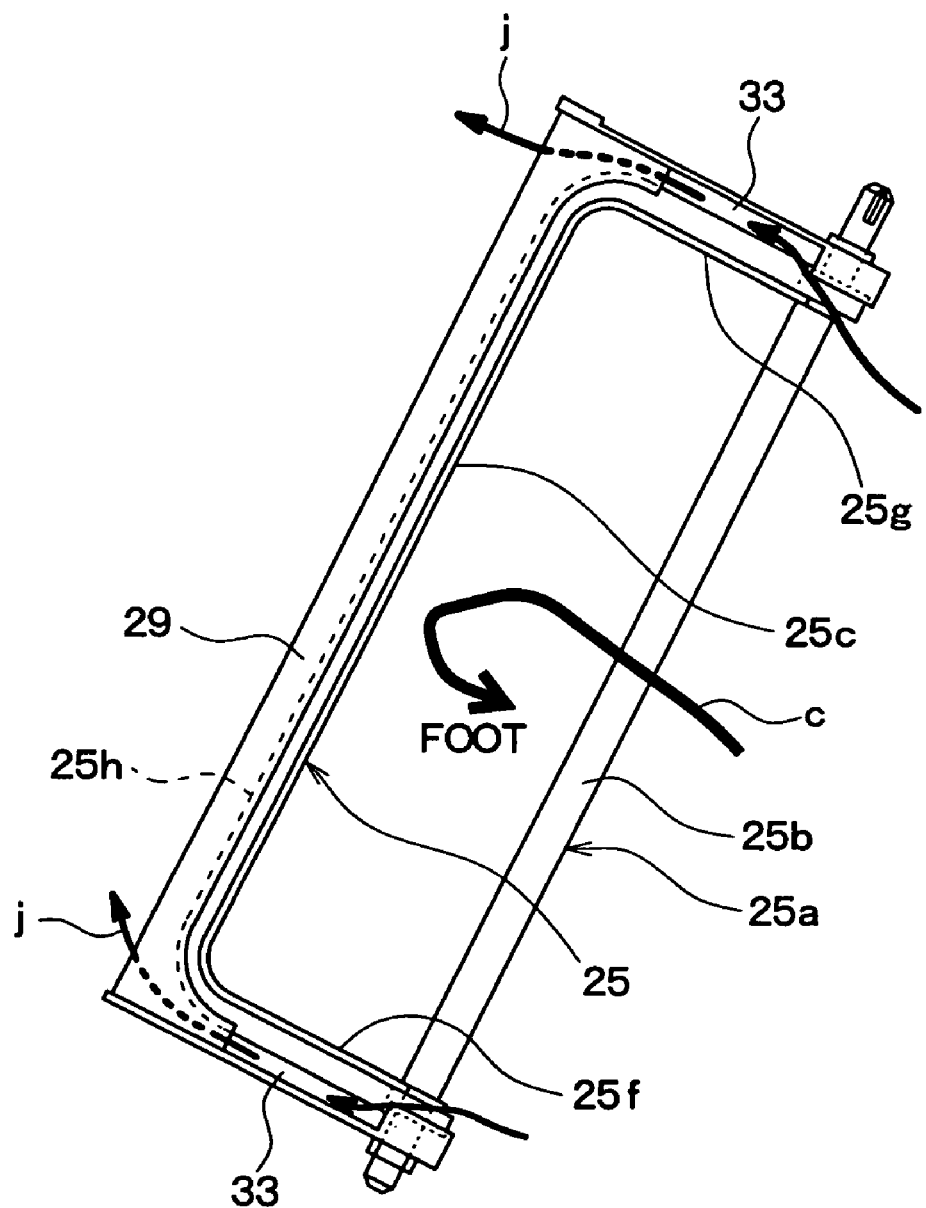
FIG. 12 is a view when being viewed from the direction shown by the arrow XII of FIG. 10.

In contrast, as shown in FIG. 12, door side openings 33 are formed on both left and right ends of the first seal rib 29. The door side openings 33 are provided to cause the air mixing portion 19 to directly communicate with both left and right second communication passages 27b, 27c (see FIG. 11).

Specifically, the door side opening 33 is formed in an elongated shape (rectangular shape) extending in the radial direction of the rotary door 25 by partially cutting off parts (recessed parts) near the rotary shaft 25a of both the left and right ends of the first seal rib 29.

Figure 13:
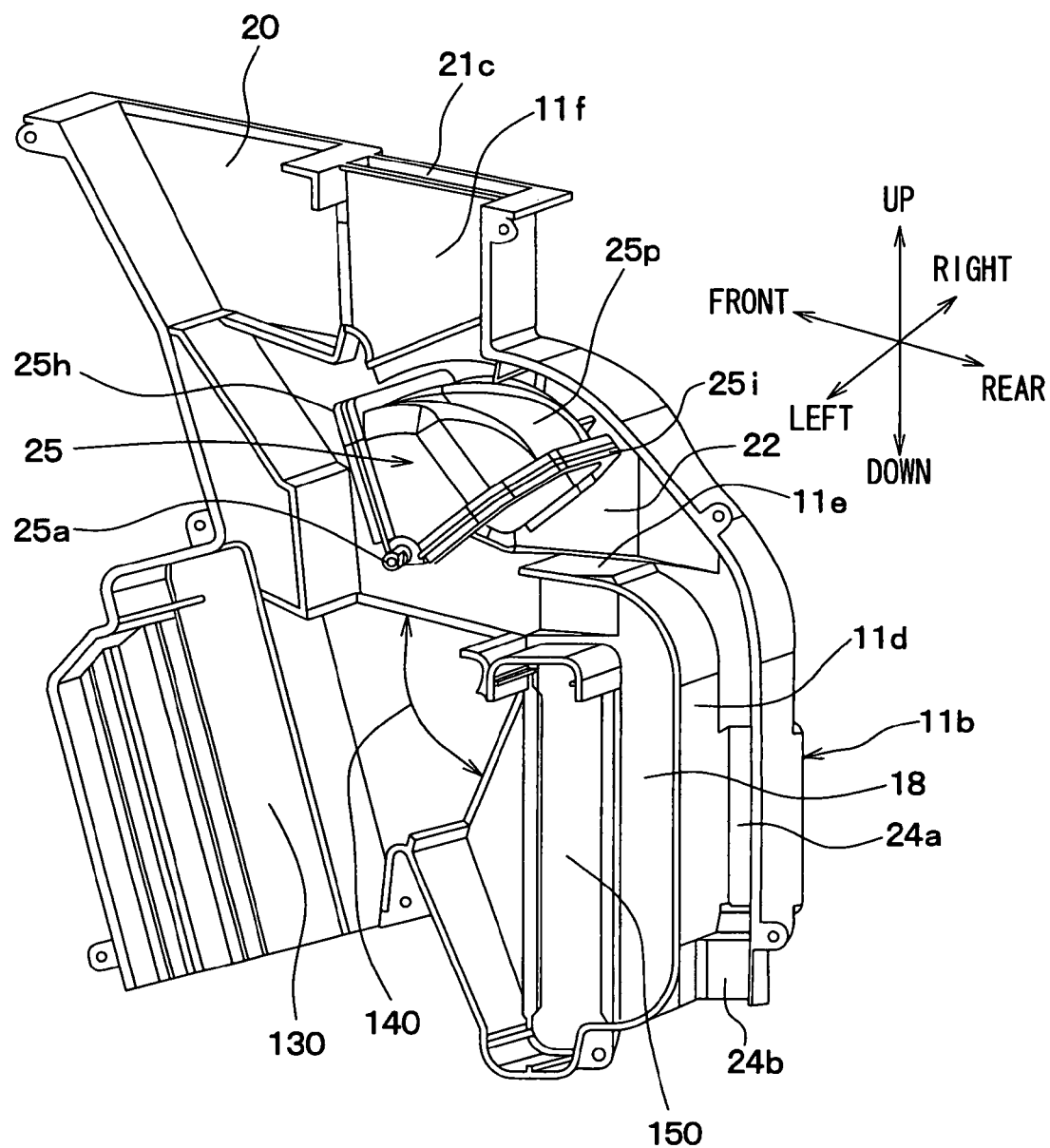
FIG. 13 is a schematic perspective view showing a part of the air conditioning unit according to the second embodiment.
Figure 16:
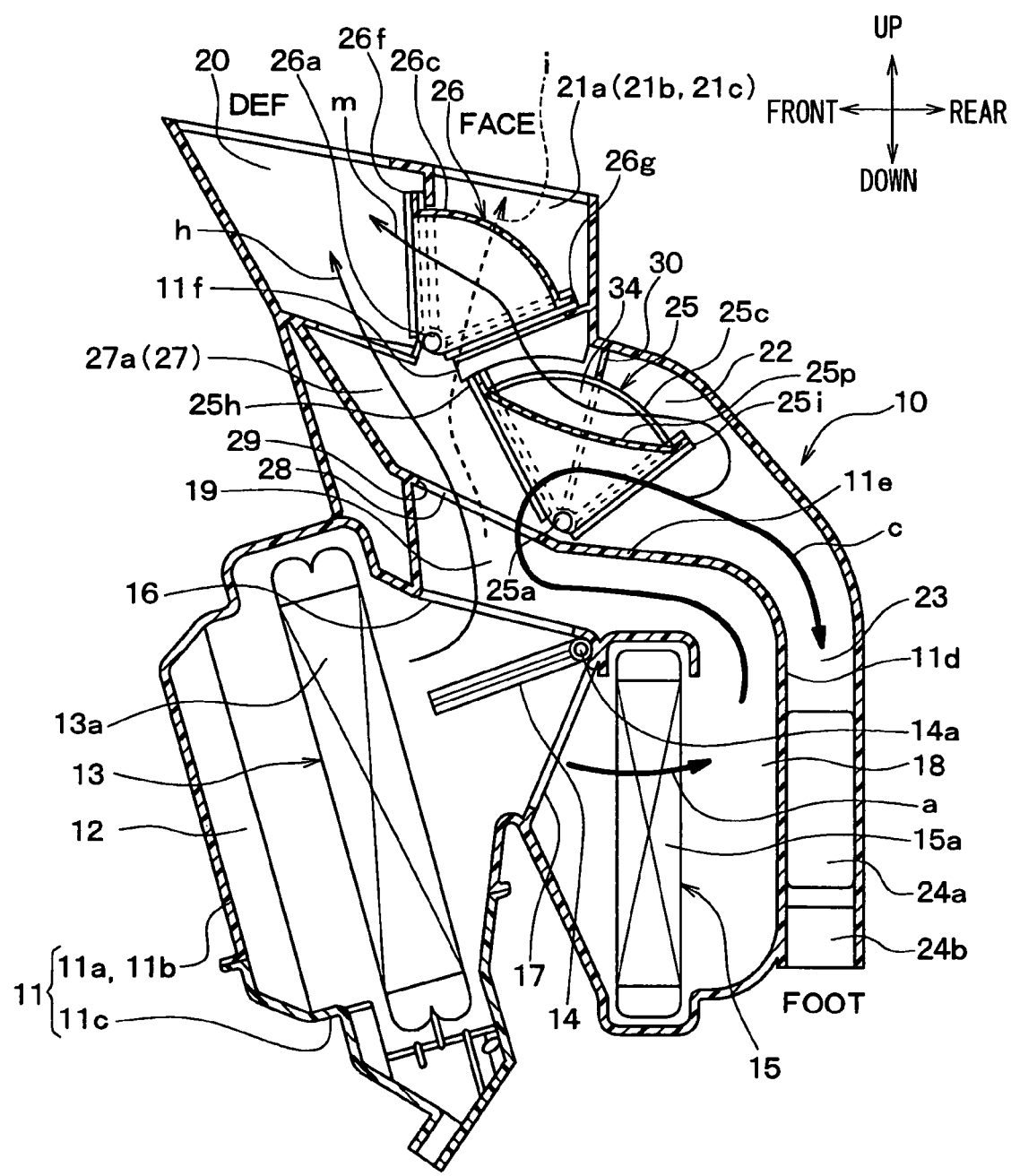
FIG. 16 is a schematic vertical sectional view showing the air conditioning unit in a foot/defroster mode, at the center portion in the vehicle right-left direction, according to the second embodiment.

Furthermore, a recessed portion 25p is formed in the center door surface 25c. This recessed portion 25p is formed in a recessed shape that is curved in an arc form toward the rotary shaft 25a as shown in FIGS. 13, 14, and 16. The arc-like curved shape of the recessed portion 25p is formed along the door circumferential direction.

Thus, as shown in FIG. 14, a dimension L2 in the radial direction of the recessed portion 25p becomes minimum in the intermediate position in the door circumferential direction. When a dimension in the radial direction of the center door surface 25c at the center of the door circumferential direction is L1 (=radius R), the relationship L1>L2 is obtained.

The recessed portion 25p is to form a warm air passage 34 (passage indicated by arrow "m") that communicates with the flow path of the foot opening 22 in the foot/defroster mode position of the first rotary door 25 shown in FIG. 16. The warm air passage 34 guides the warm air in the flow path of the foot opening 22 to the center opening area of the defroster opening 20 through the center first communication passage 27a and the inside space of the second rotary door 26, as indicated by arrow "m".

In an exploded perspective view of FIG. 13, reference numeral 130 indicates an installation part (arrangement area) of the evaporator 13, reference numeral 140 indicates a range of a rotational operation of the air mixing door 14, and reference numeral 150 indicates an installation part (arrangement area) of the heater core 15.

Figure 9:
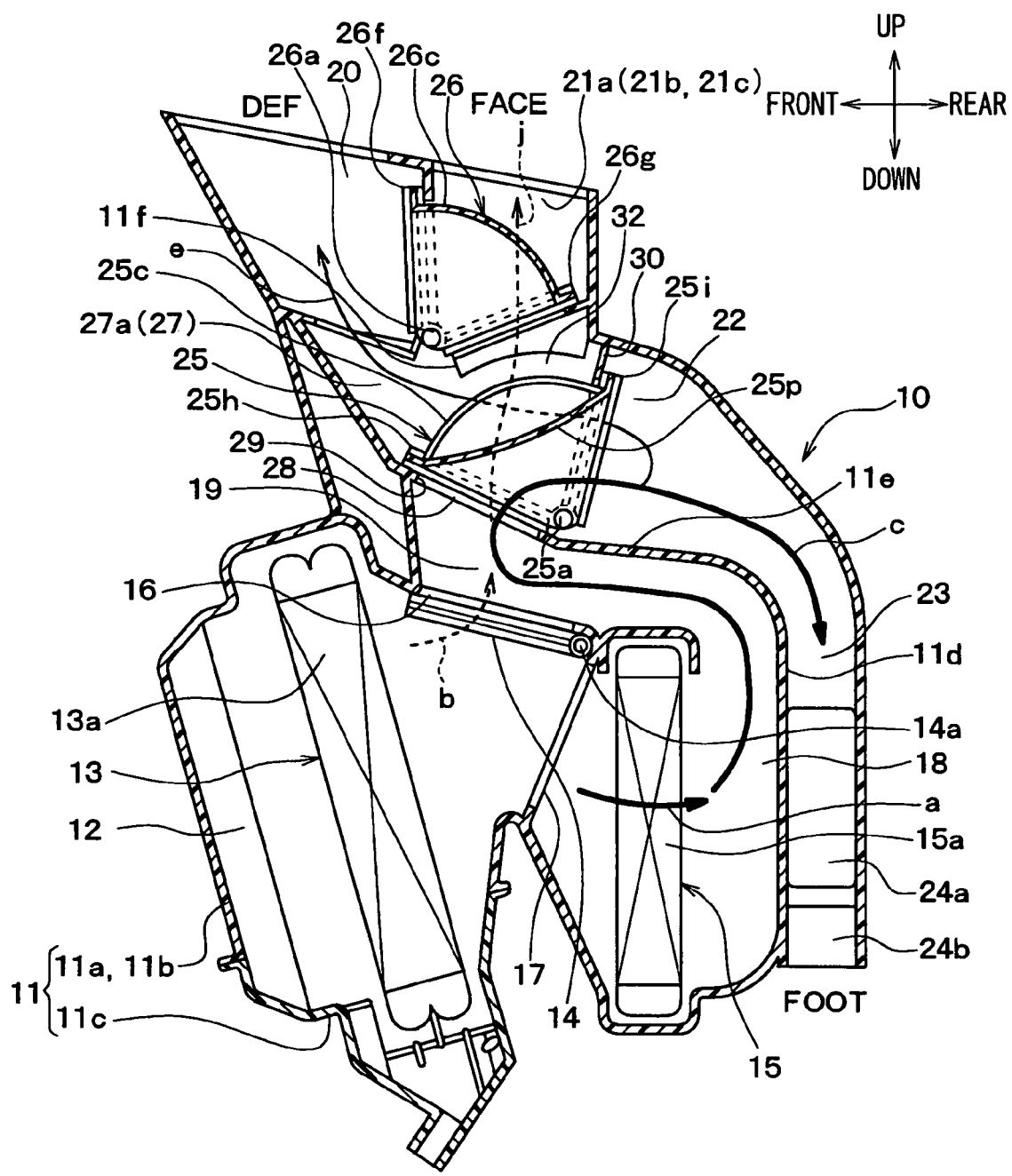
FIG. 9 is a schematic vertical sectional view showing an air conditioning unit for a vehicle air conditioner in a foot mode, at a center portion in a vehicle right-left direction, according to a second embodiment of the present invention.

Now, an operation of the second embodiment will be described below. FIGS. 9 and 10 show the foot mode in which a main flow of warm air from the air mixing portion 19 is directed toward the flow path of the foot opening 22 through the door upstream opening 28 and the inside space of the first rotary door 25 as indicated by arrow "c".

Figure 10:
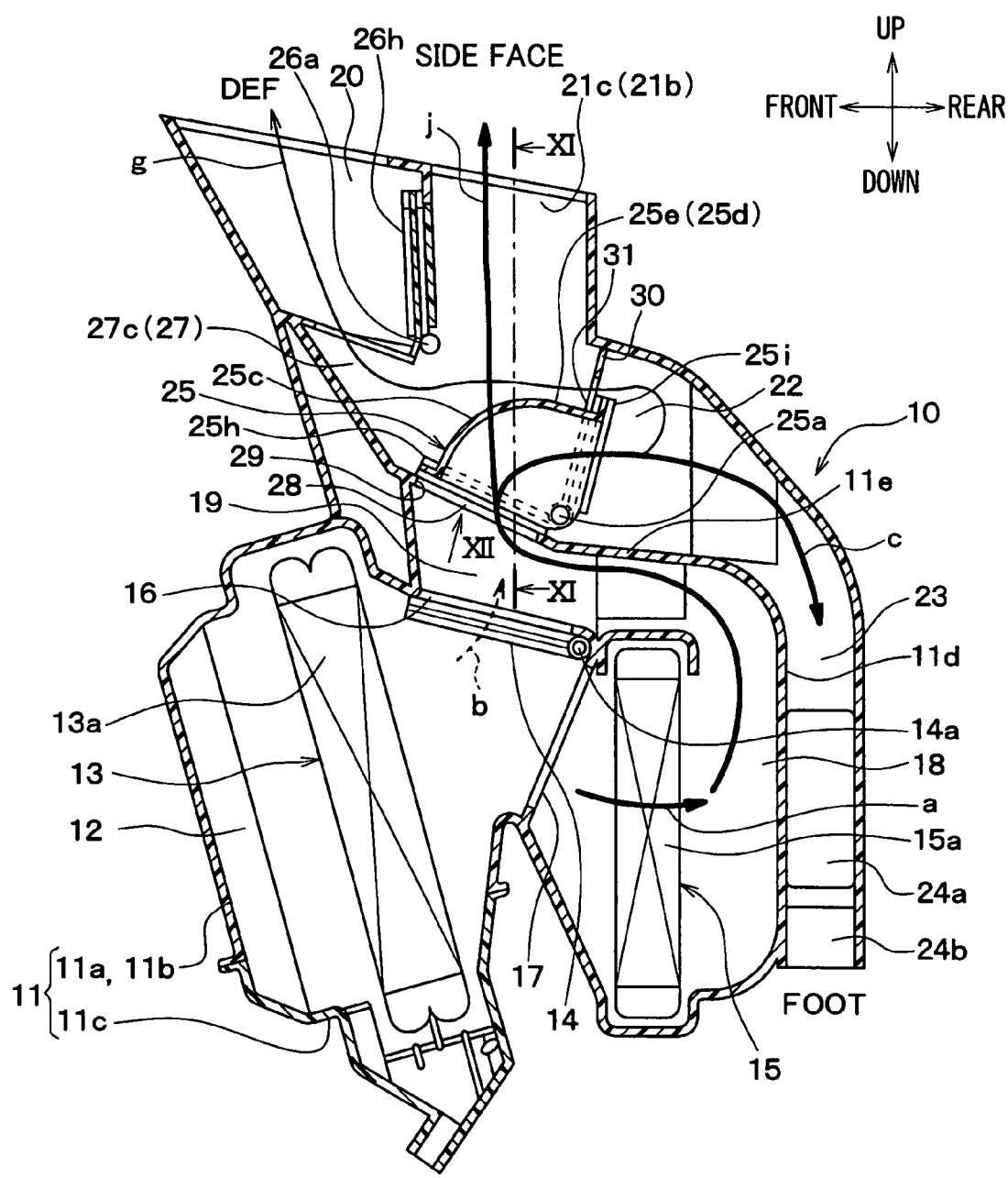
FIG. 10 is a schematic vertical sectional view showing the air conditioning unit in the foot mode at a right side portion in the vehicle right-left direction, according to the second embodiment.

A part of the warm air flow reaching the flow path of the foot opening 22 is directed, as indicated by arrow "g" in FIGS. 10 and 11, toward the right opening area of the defroster opening 20 through the right door outer peripheral opening 31 formed on the right door surface 25e and the right communication passage 27c.

The warm air passes through the left and right door outer peripheral openings 31 formed on the left and right door surfaces 25d, 25e, and then flows into the center opening area of the defroster opening 20 through the left and right communication passages 27b, 27c and the center communication passage 27a as indicated by arrow "e" in FIG. 11.

On the other hand, in the foot mode position of the first rotary door 25, the seal portion 25h on the front side of the first rotary door 25 is pressed against the first seal rib 29 as shown in FIG. 12, and the first seal rib 29 has door side openings 33 formed in a notch shape on both left and right ends. These door side openings 33 are positioned outside of the left and right sides of the front side seal portion 25h, and thus are in an open state even in the foot mode position of the first rotary door 25.

Thus, part of the warm air flows from the air mixing portion 19 pass through the door side openings 33 on the left and right ends of the first seal rib 29 as indicated by arrow "j" of FIGS. 9 to 12, and further flow into both left and right side face openings 21b, 21c through both left and right communication passages 27b, 27c.

The warm air flow directed from the flow path of the foot opening 22 to the defroster opening 20 through the door outer peripheral opening 31 needs to be bent largely in a reverse direction by 180 degrees as indicated by arrow "e" and the arrow "g" in FIG. 9 and FIG. 10, leading to a large loss in pressure at a curve.

In contrast, the warm air streams directed from the air mixing portion 19 through the door side openings 33 toward the side face openings 21b, 21c, as indicated by arrow "j", flow linearly from the air mixing portion 19 without being largely curved, resulting in a small loss in pressure.

Furthermore, the warm air streams indicated by arrow "j" flow nearly toward the side face openings 21b, 21c by combination of the linear wind direction property with the flow characteristic (Coanda effect) along the inner faces of the left and right side walls of the cases 11b, 11c, without being directed toward the defroster opening 20.

Thus, in the foot mode, the amount of air blown from the side face opening, that is, the side face blown-air amount can be effectively increased to a higher level than that of the amount of air blown from the defroster opening, that is, the defroster blown-air amount.

In addition, for the air guides 25j, 25k of the first embodiment, the interference between the air guides 25j, 25k and the second seal rib 30 needs to be avoided so as to assure the rotational operation of the rotary door 25. As a result, a height dimension of the air guides 25j, 25k should be designed to be equal to or less than a radius R of FIG. 4, which imposes limitations on the distributed air guiding effect of the air guides 25j, 25k to the side face openings 21b, 21c.

In contrast, the opening area of the door side opening 33 of the second embodiment has a high degree of flexibility in design because it is not subjected to constraints for ensuring the door rotational operation. Thus, adjusting the opening area of the door side opening 33 sets easily the distributed air rate of the side face blown-air amount to an appropriate level, for example, a ratio of the side face blown-air amount to the total blown-air amount in the foot mode described above to about 0.15 to 0.20.

Next, the foot/defroster mode of the second embodiment will be described below with reference to FIG. 16. In this foot/defroster mode, the first rotary door 25 is operated to rotate to the vehicle rear side by a predetermined angle from the most front position of the vehicle shown in FIGS. 9 and 10 to be moved to an intermediate position between the most front side position and the most rear side position of the vehicle (see FIG. 3 of the first embodiment).

Thus, the front side seal portion 25h of the first rotary door 25 is opened and separated from the first seal rib 29 of the case 11, and the rear side seal portion 25i is opened and separated from the second seal rib 30 of the case 11.

At this time, since the second rotary door 26 is maintained in the same vehicle rear position as in the foot mode, the center face opening 21a is completely closed, and the defroster opening 20 is fully opened.

Figure 17:
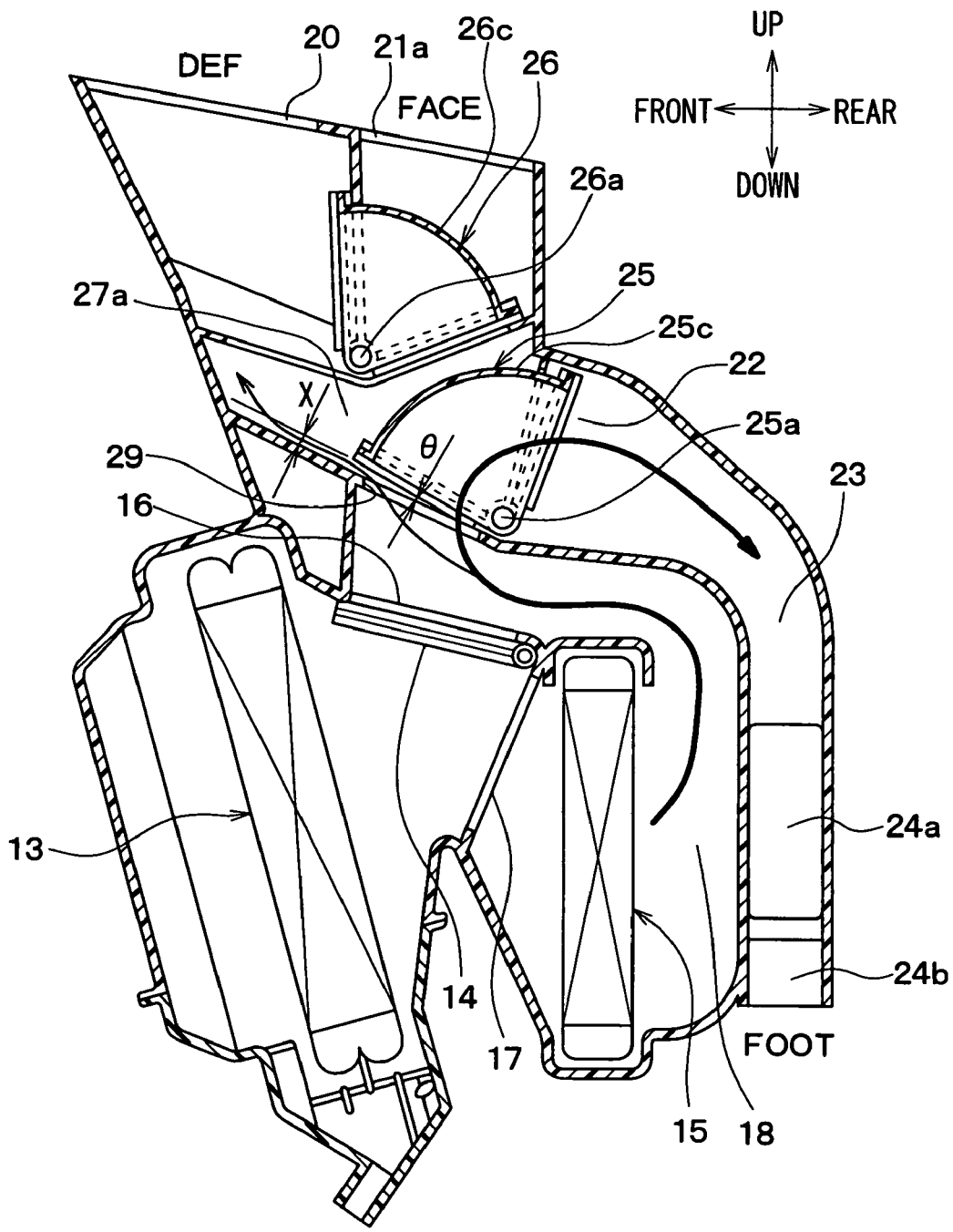
FIG. 17 is a schematic vertical sectional view showing an air conditioning unit of a vehicle air conditioner in a maximum heating state during a foot mode, at a center portion in a vehicle right-left direction, according to a prior art.
Figure 18:
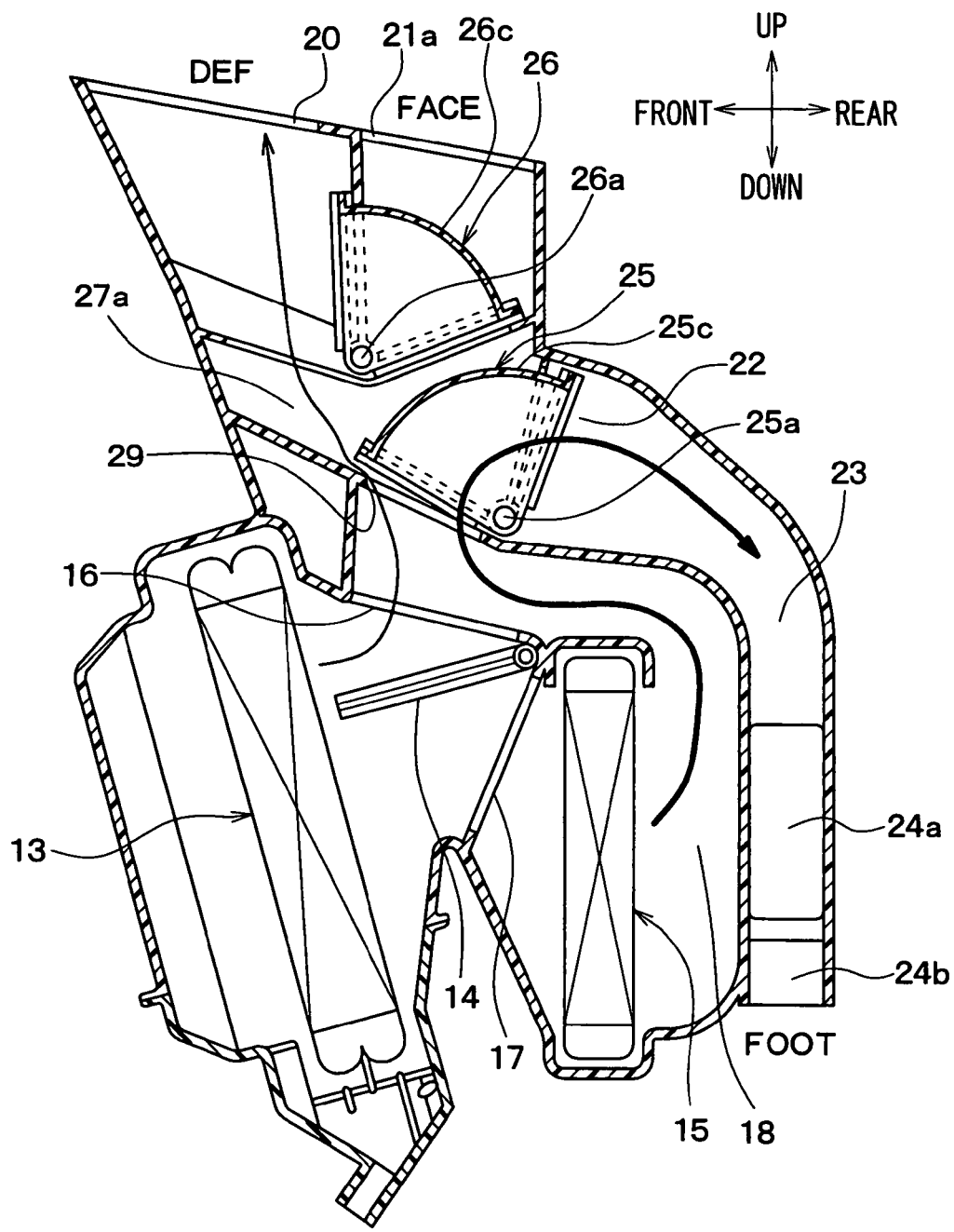
FIG. 18 is a schematic vertical sectional view showing the air conditioning unit in an intermediate temperature control state during the foot mode, at the center portion in the vehicle right-left direction, according to the prior art.
Figure 19:
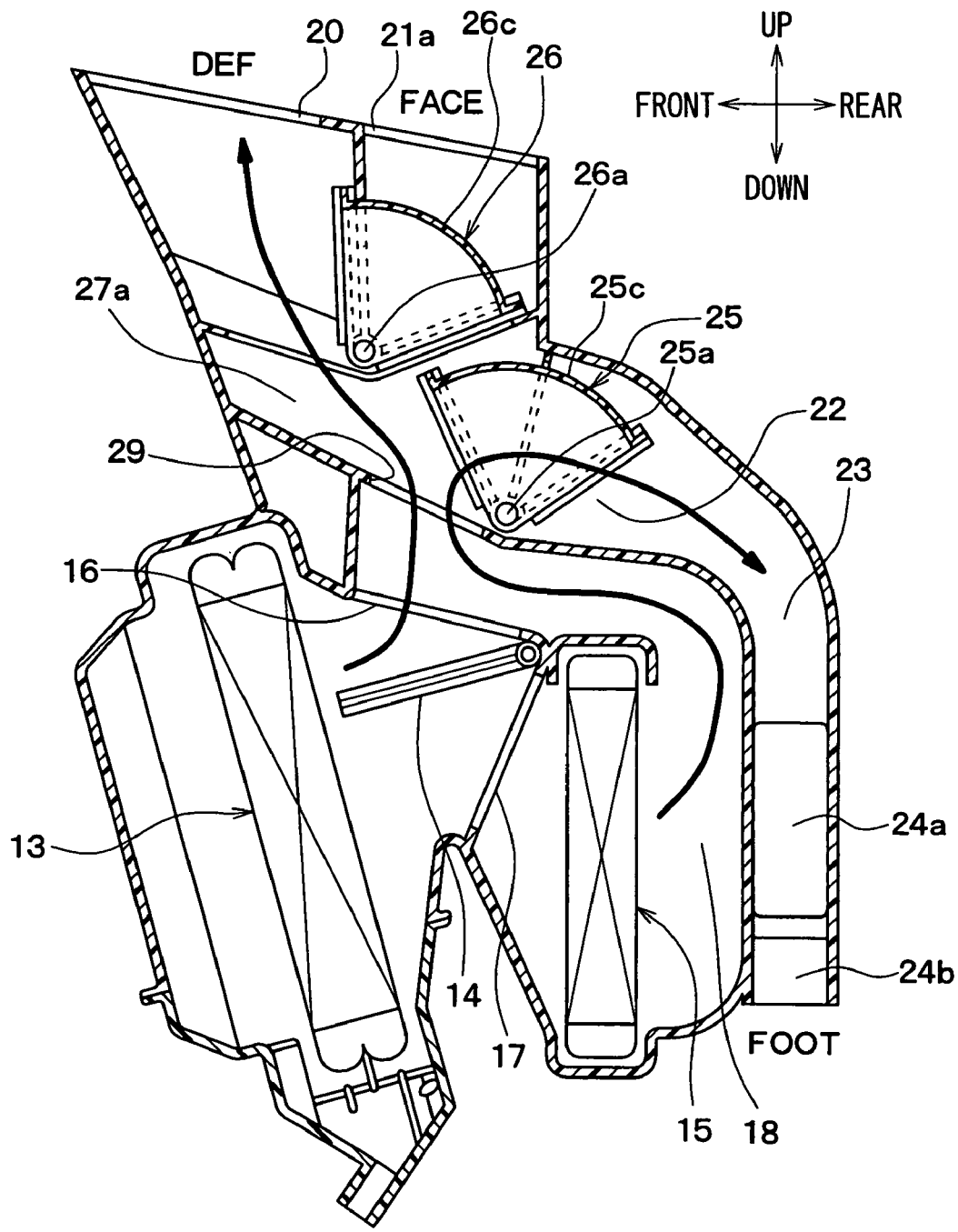
FIG. 19 is a schematic vertical sectional view showing the air conditioning unit during a foot/defroster mode, at the center portion in the vehicle right-left direction, according to the prior art.

The movement of the first rotary door 25 to the intermediate position forms air flows (see the arrows "h" and "i" in FIGS. 16 and 17) directly proceeding to the communication passages 27a, 27b, 27c through the door upstream opening 28 from the air mixing portion 19. Among the air flows, the arrow "h" indicates an air flow directed toward the defroster opening 20, and the arrow "i" indicates an air flow directed toward the side face openings 21b, 21c.

The air flows (air streams) i directed to the side face openings 21b, 21c are mainly constituted of air streams that flow through the door upstream opening 28 itself rather than the door side opening 33 by putting the door upstream opening 28 into an opened state.

Furthermore, the recessed portion 25p curved in an arc shape is formed in the center door surface 25c of the first rotary door 25. Between the recessed portion 25p and the second seal rib 30, a predetermined clearance can be formed. The clearance provided by the recessed portion 25p can form the warm air passage 34.

The warm air passage 34 branches a part of the warm air flow "c" reaching the flow path of the foot opening 22 to guide it to the center opening area of the defroster opening 20 through the center communication passage 27a and the inside space of the second rotary door 26 as indicated by arrow "m".

In the foot/defroster mode position of the first rotary door 25, most parts of the left and right door surfaces 25d, 25e move to the positions on the foot opening 22 side away from the second seal rib 30, so that the opening area of the door outer peripheral opening 31 on the left and right door surfaces 25d, 25e is brought into a substantially "0" state. This eliminates the air flow which passes through the door outer peripheral opening 31 from the flow path of the foot opening 22.

Therefore, the remaining warm air except for the branched warm air flow indicated by arrow "m" among the warm air reaching the foot opening 22 is blown off from the left and right foot air outlet ports 24a on the front seat side and from the foot air outlet port 24b on the rear seat side toward the passenger's foot area after having passed through the foot air outlet passage 23, thereby heating the inside of the passenger compartment.

In the rotational position in the foot/defroster mode of the first rotary door 25, like the first embodiment, the flow path of the air flow "h" directly proceeding from the air mixing portion 19 to the defroster opening 20 is fully opened, while the opening degree of the flow path of the air flow "i" directed toward the side face openings 21b, 21c is limited to one half or less of the full opening degree by the first rotary door 25.

As a result, the defroster blown-air amount, which is the amount of air blown from the defroster opening 20, can be increased to the same degree as the foot blown-air amount, which is an amount of air blown from the foot opening 22. This can increase the defroster blown-air amount in the foot/defroster mode as compared to in the foot mode, thereby improving the defrosting effect of the vehicle windshield more than in the foot mode.

Even in the foot/defroster mode, a part of air (warm air) of the air mixing portion 19 can directly flow into both left and right side face openings 21b, 21c through left and right communication passages 27b, 27c as indicated by arrow "i". Thus, the air (warm air) of the side face openings 21b, 21c is blown off from the side face air outlet ports (not shown) on both left and right ends of the vehicle dashboard (instrument panel) toward the inner surface of the window pane on the vehicle side or the passenger's upper body on the window pane side, thereby exhibiting the defrosting effect of the window pane on the vehicle side or the heating effect of the passenger's upper body on the window pane side.

The ratio of the side face blown-air amount from the side face openings 21b, 21c in the foot/defroster mode to the total blown-air amount is about 0.15 to 0.20, like in the foot mode.

Now, the technical meaning of the warm air passage 34 will be described. As the air flow into the defroster opening 20 as indicated by arrow "h", the low-temperature air on the cold air passage 16 side in the air mixing portion 19 tends to flow. In contrast, as the air flow into the foot opening 20 as indicated by arrow "c", the hot-temperature air on the warm air passage 18 side in the air mixing portion 19 tends to flow.

As a result, in the foot/defroster mode, a phenomenon of cool defrosting tends to occur in which the temperature of air blown toward the defrosting side is extremely low as compared with the temperature of air blown toward the foot side.

According to the present embodiment, the recessed portion 25p formed in the center door surface 25c of the first rotary door 25 can form the warm air passage 34, by which a part of the high-temperature warm air flow "c" reaching the flow path of the foot opening 22 can be guided to the center open area of the defroster opening 20 as indicated by arrow "m".

This can prevent the defroster blown-air temperature from being extremely decreased as compared to the foot blown-air temperature. Even in the foot/defroster mode, an appropriate difference between the upper and lower blown-air temperatures can be set. Thus, the defrosting performance of the window pane and the comfort heating feel can be both ensured in the foot/defroster mode.

In the second embodiment, the operation of the air conditioning unit 10 during the other air outlet mode such as the defroster mode, the face mode or the bi-level mode can be made similarly to those in the above-described first embodiment.

Other Embodiments

Although the present invention has been fully described in connection with the preferred embodiments thereof with reference to the accompanying drawings, it is to be noted that various changes and modifications will become apparent to those skilled in the art.

(1) For example, in the above-described second embodiment, the recessed portion 25p of the center door surface 25c of the first rotary door 25 is formed in an arc curved shape. However, the recessed portion 25p may be formed in a plane shape as indicated by the alternate long and two short dashed line "n" in FIG. 14. In other words, the recessed portion 25p may be formed to satisfy the following dimensional relation: L1>L2 in FIG. 14.

(2) On the center door surface 25c of the first rotary door 25 in the first embodiment, the recessed portion 25p of the second embodiment is not formed. However, the recessed portion 25p may be formed on the center door surface 25c of the first rotary door 25 of the first embodiment so as to form the warm air passage 34 made of the recessed portion 25p in the foot/defroster mode of the first embodiment.

(3) In the above-described embodiments, each of the left and right door surfaces 25d, 25e has an outline formed in an inclined shape that is reduced in radial dimension from the center part near the center door surface 25c toward both left and right ends. However, the outline of these left and right door surfaces 25d, 25e is not limited thereto, and may be formed in a shape that has a constant radial dimension from the center part near the center door surface 25c to both left and right ends (in a shape parallel to the door axial direction). In other words, the outline of the left and right door surfaces 25d, 25e may be formed in a shape from the center part to both left and right ends that has a constant radial dimension smaller than that of the center door surface 25c.

(4) In the above-described embodiments, the door surfaces 25c, 26c of the first and second rotary doors 25, 26 are formed in an arc shape, but may be formed in a flat shape.

(5) In the above-described embodiments, a mode door for switching of the face/defroster is constructed of the rotary door 26 having the door surface 26c that rotates around the rotary shaft 26a in a position separated from the shaft by a predetermined dimension in the radial direction. However, the mode door for switching of the face/defroster is not constructed of the rotary door 26, and may be constructed of a plate door.

Specifically, the plate door may be a cantilever plate door with a rotary shaft disposed at one end of a plate-like door surface, or a butterfly door with a rotary shaft disposed at the center of a plate-like door surface.

The above-described embodiment has described the air mixing type air conditioning unit 10 which is adapted to adjust the ratio of the amount of warm air heated through the heater core 15 to the amount of cold air passing through the cold air passage 16 by the air mixing door 14, thereby adjusting the temperature of air blown into the passenger compartment. However, the present invention may be applied to a hot water control type air conditioning unit 10 which is adapted to adjust the temperature of air blown into the passenger compartment by adjusting the flow rate or temperature of hot water circulating through the heater core 15.

(7) In the above-described embodiments, the evaporator 13 and the heater core 15 are arranged longitudinally such that air inflow and outflow surfaces of the evaporator 13 and of the core portions 13a, 15a of the heater core 15 extend in a substantially vertical or up-down direction. It is apparent that the present invention can be implemented even in a structure including the evaporator 13 and the heater core 15 which are arranged horizontally in such a manner that the air inflow and outflow surfaces of the evaporator 13 and of the core portions 13a, 15a of the heater core 15 extend substantially horizontally.

(8) In the above-described embodiments, the rotary door 25 is typically used for the air conditioner for a vehicle. However, the rotary door 25 can be used for an air passage opening/closing device for the other use. For example, the rotary door 25 can be suitably used in an air duct.

Such changes and modifications are to be understood as being within the scope of the present invention as defined by the appended claims.

What is claimed is:

1. An air conditioner for a vehicle having a passenger compartment, the air conditioner comprising:
    an air conditioning case for defining an air passage through which air flows into the passenger compartment;
    a heating heat exchanger for heating air, located in the air conditioning case;
    an air outlet opening portion provided in the air conditioning case at a downstream air side of the heating heat exchanger, wherein the air outlet opening portion includes a defroster opening through which air is blown toward a windshield of the vehicle, a center face opening through which air is blown toward a first upper area of the passenger compartment, a side face opening through which air is blown toward a second upper area of the passenger compartment, and a foot opening through which air is blown toward a lower area of the passenger, and wherein the side face opening is provided at two sides of the center face opening in a vehicle left-right direction;
    a first communication path provided in the air conditioning case to communicate with the defroster opening and the center face opening;
    a second communication path provided in the air conditioning case at left and right sides of the first communication path in the vehicle left-right direction to communicate with the side face opening and the defroster opening;
    a first door that is a rotary door and is located to open and close the foot opening;
    a second door that is located to open and close the defroster opening and the center face opening;
    a first seal rib for defining a peripheral end portion of a door-upstream opening portion at an upstream side of the first door in the air conditioning case; and
    a second seal rib for defining a peripheral end portion of the foot opening, wherein:
    the first door includes a rotation shaft, a door surface that is spaced from an axial line of the rotation shaft radially outside and is rotated integrally with the rotation shaft, and a seal portion provided at a peripheral end portion of the door surface;
    the door surface has a first door face at a position corresponding to the first communication path, and a second door face positioned at left and right sides of the first door face to correspond to the second communication path;
    the first door face has an outer shape such that the seal portion of the first door face contacts the second seal rib;
    at least a part of the second door face has a radial dimension from the axial line, that is smaller than that of the first door face so as to form a door outer peripheral space between the seal portion of the second door face and the second seal rib;
    when the first door is rotated to a foot-mode position to open the foot opening, the seal portion of the first door face contacts the second seal rib to shut a path communication between the foot opening and the first communication path, and the second communication path communicates with the foot opening through the door outer peripheral space;
    the door surface has an anti-foot opening side peripheral end that is shaped such that the seal portion of the anti-foot opening side peripheral end contacts an entire area of the second seal rib when the foot door is rotated to the foot-mode position; and
    the first seal rib is provided with a door-side opening portion such that the door-upstream opening portion directly communicates with the second communication path through the door-side opening portion when the foot door is rotated to the foot-mode position.

2. The air conditioner according to claim 1, wherein the door-side opening portion is a recess part that is provided at left and right end portions of the first seal rib to be elongated in a radial direction of the first door.

3. The air conditioner according to claim 1, wherein:
the first door face of the door surface of the first door is provided with a recessed portion through which air flows toward the defroster opening.

4. The air conditioner according to claim 3, wherein the recessed portion is curved in an arc shape toward radially inside in a radial direction of the first door.

5. The air conditioner according to claim 1, wherein the second door face is provided by a predetermined range from an end portion of the door surface of the first door, at a side of the foot opening, to a portion in a circumferential direction of the door surface.

6. The air conditioner according to claim 1, wherein the second door face is inclined such that the radial dimension is reduced from a portion adjacent to the first door face toward an axial end in the first door.

7. The air conditioner according to claim 1, wherein the heating heat exchanger is located in the air conditioning case to form a warm air passage through which air having passed through the heating heat exchanger flows, and a cold air passage through which air flows while bypassing the heating heat exchanger, the air conditioner further comprising an air mixing door for adjusting a flow ratio between air passing through the warm air passage and air passing through the cold air passage, wherein the rotary shaft of the first door is located adjacent to the warm air passage more than the cold air passage.

* * * * *